United States Patent
Sugie

(10) Patent No.: US 9,723,220 B2
(45) Date of Patent: Aug. 1, 2017

(54) IMAGING APPARATUS, CONTROL METHOD, AND PROGRAM

(71) Applicant: CANON KABUSHIKI KAISHA, Tokyo (JP)

(72) Inventor: Kazuhiko Sugie, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 225 days.

(21) Appl. No.: 14/274,553

(22) Filed: May 9, 2014

(65) Prior Publication Data

US 2014/0333800 A1 Nov. 13, 2014

(30) Foreign Application Priority Data

May 13, 2013 (JP) .................................. 2013-101287

(51) Int. Cl.
| | | |
|---|---|---|
| *H04N 5/235* | (2006.01) | |
| *H04N 5/238* | (2006.01) | |
| *G03B 7/00* | (2014.01) | |
| *H04N 101/00* | (2006.01) | |

(52) U.S. Cl.
CPC ............ *H04N 5/2355* (2013.01); *G03B 7/00* (2013.01); *G03B 7/003* (2013.01); *H04N 5/238* (2013.01); *H04N 5/2356* (2013.01); *H04N 2101/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0071044 A1* | 6/2002 | Takahashi | ............. | H04N 5/235 348/294 |
| 2002/0145674 A1* | 10/2002 | Nakamura | ............. | H04N 5/235 348/296 |
| 2010/0097493 A1* | 4/2010 | Asoma | ............. | H04N 5/235 348/229.1 |
| 2011/0090372 A1 | 4/2011 | Doida | | |

FOREIGN PATENT DOCUMENTS

| | | |
|---|---|---|
| CN | 102420944 A | 4/2012 |
| CN | 102422124 A | 4/2012 |
| CN | 102509279 A | 6/2012 |

* cited by examiner

*Primary Examiner* — Twyler Haskins
*Assistant Examiner* — Akshay Trehan
(74) *Attorney, Agent, or Firm* — Canon U.S.A., Inc. IP Division

(57) ABSTRACT

Included is an imaging unit that outputs images by imaging a subject, a light amount adjustment unit that drives a light amount adjustment member to adjust the amount of light input to the imaging unit, a control unit that controls the imaging unit so that after a first image is output by the imaging unit, a second image having an exposure amount different from that of the first image is output, and a setting unit that sets the difference in the exposure amount between the first image and the second image. The first image and the second image are images used for compositing. The setting unit sets the difference in the exposure amount between the first image and second image so that the relative relationship in the exposure amount between the first image and the second image imaged when the light amount adjustment unit is operating is the same as the relative relationship in the exposure amount between the first image and the second image imaged when the light amount adjustment unit is not operating.

19 Claims, 17 Drawing Sheets

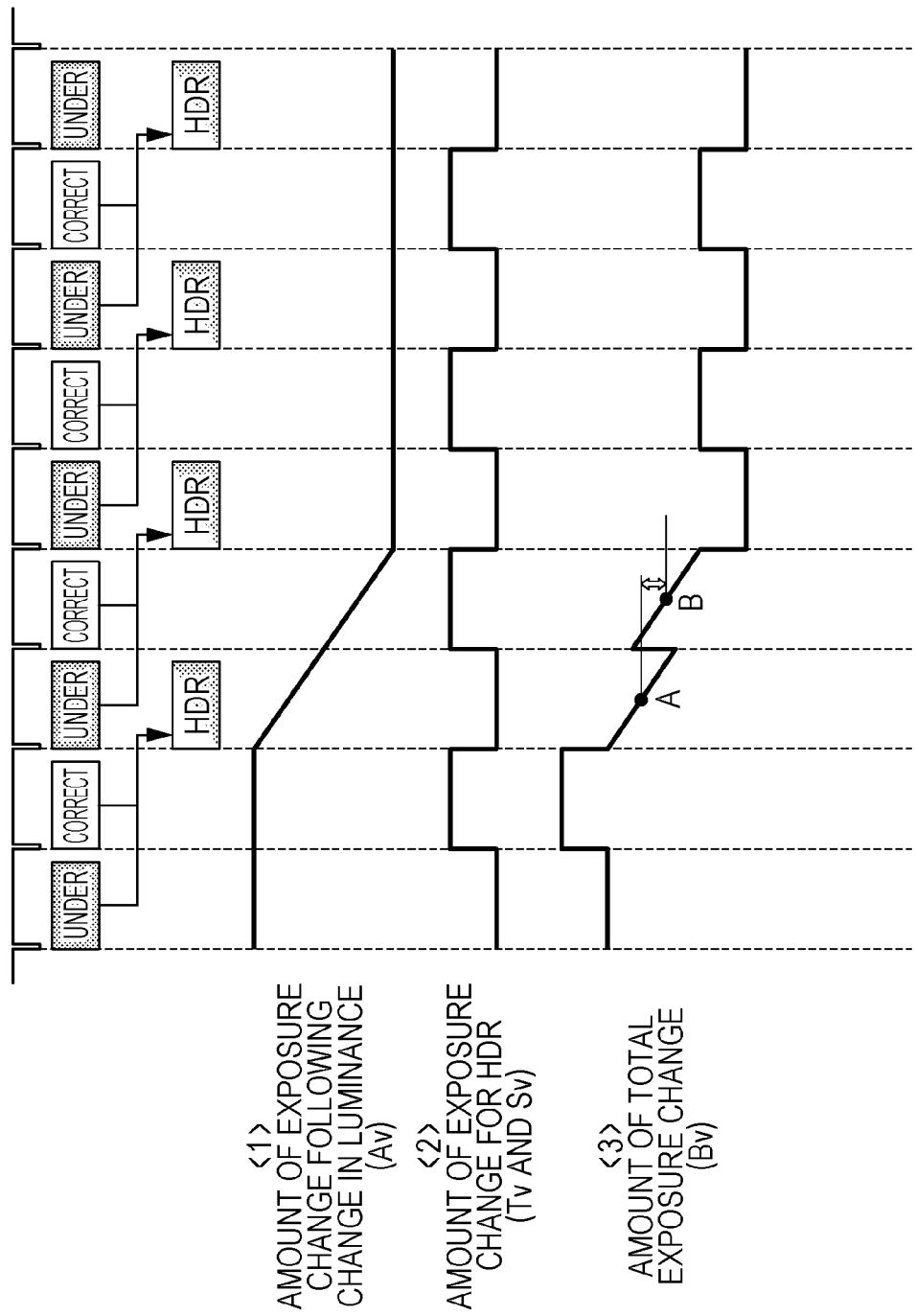

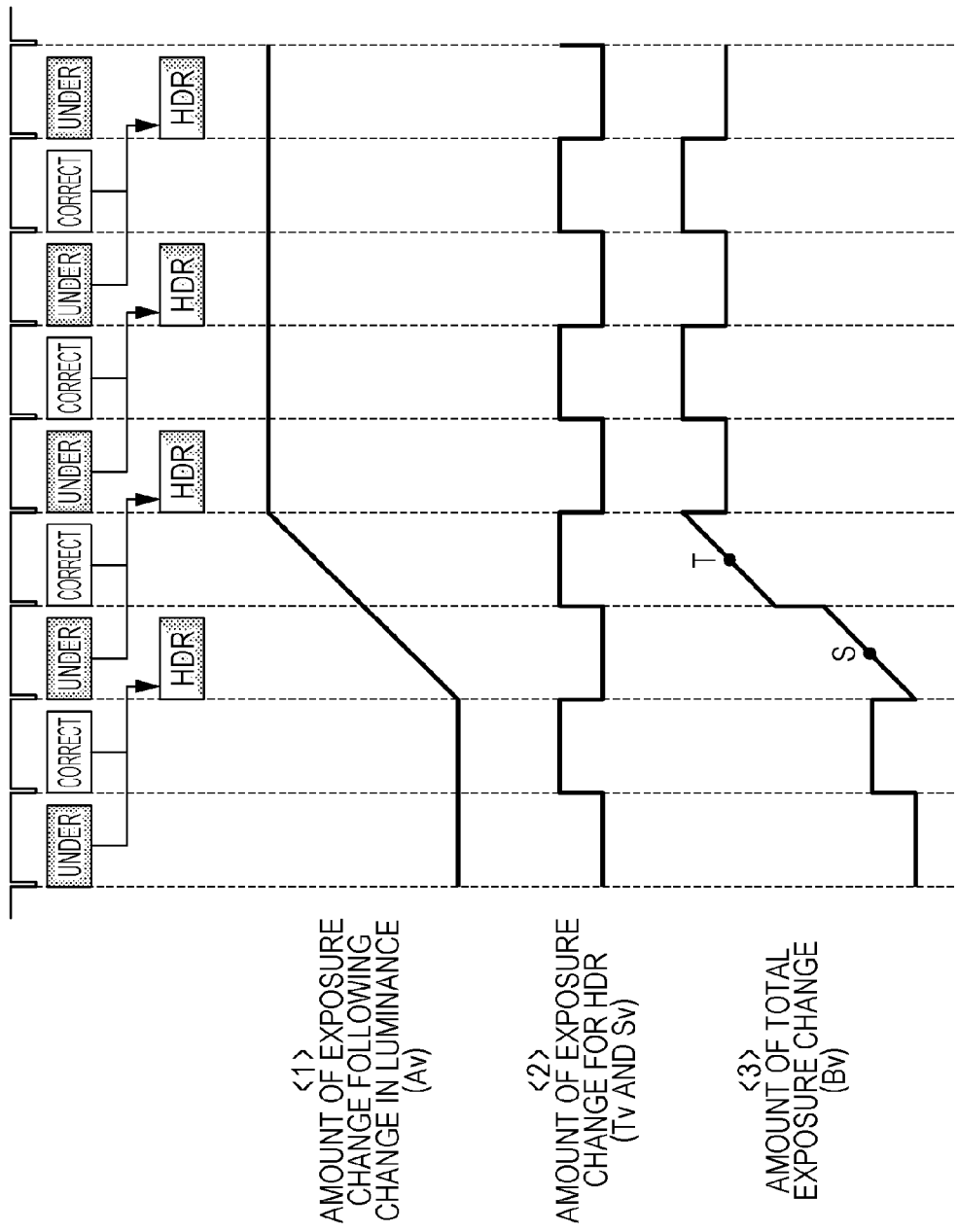

IMAGING APPARATUS, CONTROL METHOD, AND PROGRAM

BACKGROUND OF THE INVENTION

Field of the Invention

The present invention relates to an imaging apparatus for obtaining multiple images having different exposures, a control method thereof, and a program.

Description of the Related Art

According to the related art, there is a common technology known as high dynamic range (HDR) composite processing in imaging apparatuses, which is a technology to expand dynamic range in which multiple images of the same scene are obtained at different exposures, and these multiple images are composited.

HDR composite processing first obtains an image with the exposure amount corresponding to the photometry result of the subject (correct exposure amount). Next, either one of or both images imaged at exposure amounts relatively less than the correct exposure amount (underexposure amount) and at exposure amounts relatively more than the correct exposure amount (overexposure amount) is/are obtained. Thus, a composite image having a wide dynamic range can be obtained by compositing these images with these different exposure amounts.

As a moving image HDR technology applying the aforementioned configuration to moving images, US2002/0071044 proposes an imaging apparatus which is capable of periodically obtaining (imaging) images at different exposures, compositing these images within the imaging apparatus, and continuously outputting the images.

SUMMARY OF THE INVENTION

An aspect of the claimed invention is an imaging apparatus. The imaging apparatus includes: an imaging unit configured to output images by imaging a subject; a light amount adjustment unit configured to drive a light amount adjustment member to adjust the amount of light input to the imaging unit; a control unit configured to control the imaging unit so that after a first image is output by the imaging unit, a second image with an exposure amount different from that of the first image is output; and a setting unit configured to set a difference in the exposure amount between the first image and the second image. The first image and the second image are images used for compositing. The setting unit sets the difference in the exposure amount between the first image and second image so that the relative relationship in the exposure amount between the first image and the second image imaged when the light amount adjustment unit is operating is the same as the relative relationship in the exposure amount between the first image and the second image imaged when the light amount adjustment unit is not operating. According to the claimed invention, exposure control following changes in luminance of the subject is performed while multiple images having different exposure amounts used for compositing are correctly obtained.

Further features of the present invention will become apparent from the following description of exemplary embodiments (with reference to the attached drawings).

BRIEF DESCRIPTION OF THE DRAWINGS

FIGS. 3A through 3C are timing charts illustrating example timings of exposure control in the imaging apparatus according to the First Embodiment of the present invention.

FIGS. 12A and 12B are timing charts illustrating example timings of exposure control in the imaging apparatus according to another Embodiment of the present invention.

DESCRIPTION OF THE EMBODIMENTS

First Embodiment

Basic Configuration of Device

Figure 1:
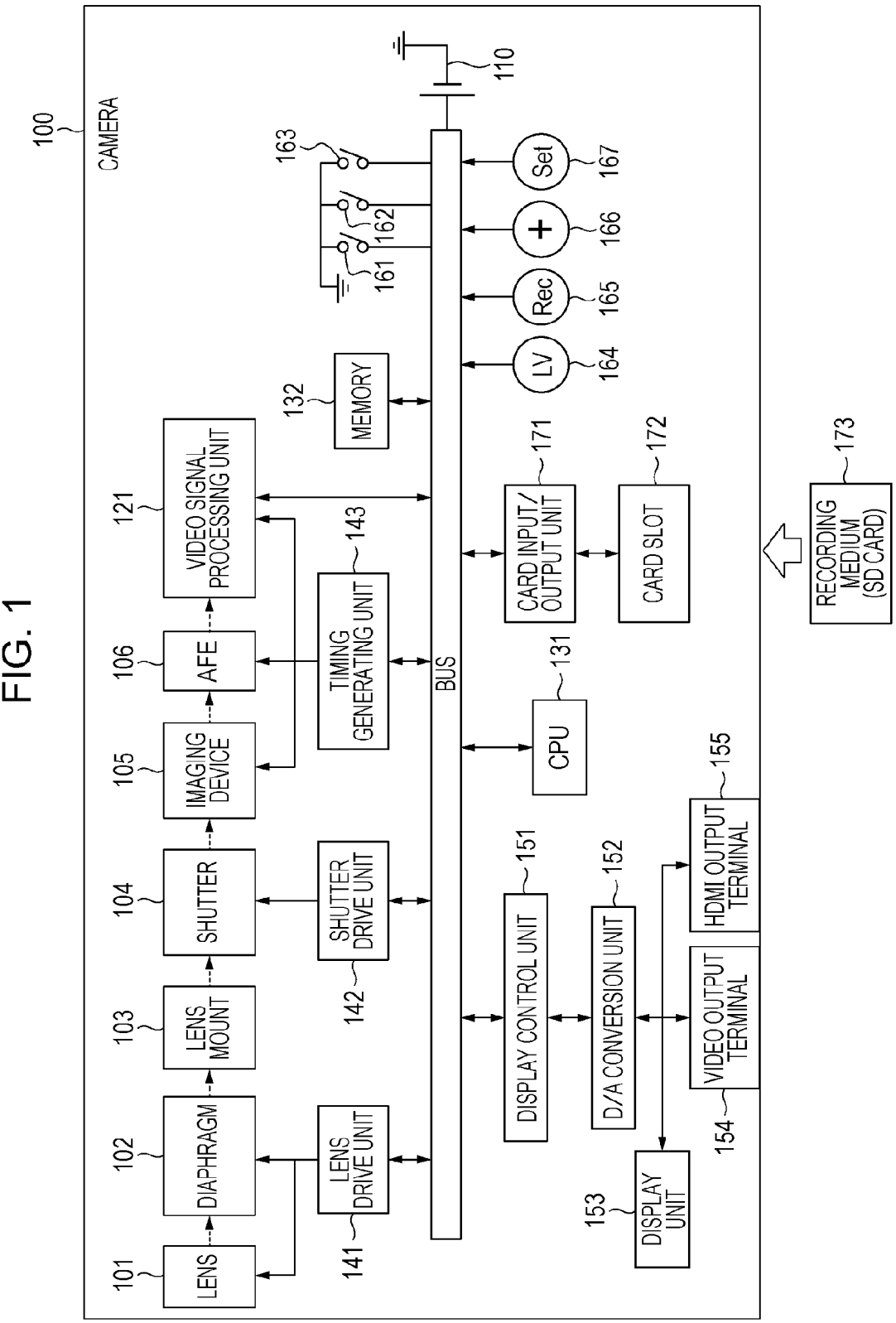
FIG. 1 is a diagram illustrating an example configuration of an imaging apparatus according to a First Embodiment of the present invention.

Hereafter, an embodiment of the present invention will be described with reference to FIGS. 1 and 2. FIG. 1 is a diagram illustrating an example configuration of a digital camera 100, which is an imaging apparatus according to the present embodiment (hereinafter, referred to as simply camera). Hereafter, the basic configuration of the camera 100 will be described with reference to FIG. 1.

A lens 101 is a lens group that guides an incident optical image to the lens 101, to an imaging device 105 described later. Additionally, the lens 101 is a lens group made up of multiple lenses including a focus lens, zoom lens, and shift lens.

A diaphragm 102 is a light amount adjusting member that adjusts the amount of incident light into the camera 100 (particularly, the imaging device 105) via the lens 101.

A lens drive unit 141 is a light amount adjusting unit that controls the drive of the lens 101 and diaphragm 102 in accordance with instructions from a central processing unit (CPU) 131 (light amount adjusting unit) described later. The lens 101 is driven by operating the lens drive unit 141 to enable control of the zoom operation and focus operation regarding the subject. The drive of the diaphragm 102 is controlled by operating the lens drive unit 141 to adjust the amount of light input to the imaging device 105. According to the present embodiment, the light amount adjusting member will be described with the diaphragm 102, but the configuration may also use a neutral density (ND) filter as the light amount adjusting member. In this case, the lens drive unit 141 controls the drive and operation of the ND filter.

A lens mount 103 is a connection unit for connecting lens 101 to the camera 100 body. The camera 100 according to the present embodiment is a so-called interchangeable lens digital camera in which the lens 101 may be mounted and removed from the camera body. The camera 100 may also be a digital camera in which the lens 101 and the camera body are integrated units.

A shutter 104 is a light-shielding member driven by a shutter drive unit 142 to switch the state of the imaging device 105 between an exposed state and a shielded state.

The imaging device 105 is an imaging unit configured with a charge accumulation imaging sensor such as a charge-coupled device (CCD) or complementary metal-oxide semiconductor (CMOS). The imaging device 105 outputs analog image date corresponding to the optical image after the optical image of the subject guided by the lens 101 is imaged on the imaging device 105. The imaging device 105 can adjust the accumulation time by changing the reset timing of accumulated electrical charges.

An analog front end (AFE) 106 performs gain adjustments, sampling, and A/D conversion on the analog image data output from the imaging device 105, and then outputs the image data to a video signal processing unit 121 as digital image data.

Next, the video signal processing unit 121 according to the present embodiment will be described with reference to FIG. 2. FIG. 2 is a block diagram illustrating an example configuration of the video signal processing unit 121. The video signal processing unit 121 executes various types of image processing on the digital image data output from the AFE 106. Hereafter, the internal configuration and operation of each unit in the video signal processing unit 121 will be described.

The video signal processing unit 121 is provisioned internally with a photometry calculating unit 201, a development processing unit 202, a memory interface 203, a compositing unit 204, and a moving image encoding processing unit 205.

The photometry calculating unit 201 is a photometry calculating unit that measures the subject based on the digital image data output from the AFE 106, and obtains the brightness of the subject.

The development processing unit 202 is a processing unit that executes processing such as white balance, color interpolation, color correction, 7 conversion, edge emphasis, and resolution conversion on the image data digitally converted by the AFE 106. The results of processing by the development processing unit is output to a memory 132 connected externally to the video signal processing unit 121 via the memory interface 203 and a bus 150.

According to the present embodiment and regarding HDR composite processing described later, the subject is imaged multiple times at different exposure amounts, and the data for the multiple images having different exposure amounts corresponding to the images is output to (obtained by) the imaging device 105. The development processing unit 202 applies the aforementioned various types of processing to the data for each of the multiple images having different exposure amounts output from the imaging device 105. The processed image data is stored in the memory 132. The CPU 131, which is the controlling unit described later, controls the output of the multiple images having different exposure amounts to the imaging device 105. Details on the method to obtain the multiple images having different exposure amounts will be described later.

The memory interface 203 is an interface connected to the memory 132 via the bus 150, and obtains and outputs data used internally to the video signal processing unit 121.

The compositing unit 204 is a compositing unit that reads, from the memory 132, data for the multiple images having different exposure amounts output from the development processing unit 202, and composites the multiple images having different exposure amounts. The composited image data (hereinafter, referred to as simply the composite image) is output from the compositing unit 204 to the memory 132 as the composite data.

The moving image encoding processing unit 205 is a processing unit that reads the composite image from the memory 132, and performs an encoding process. Moving image data can be generated in the moving image encoding processing unit 205 by conducting the encoding processing on the composite image. The generated moving image data is stored in the memory 132. This concludes the configuration of the video signal processing unit 121 according to the present embodiment.

Next, the memory 132 illustrated in FIG. 1 is a storage unit that stores various types of data processed internally to the camera 100 by the aforementioned video signal processing unit 121 and other units. For example, the memory 132 stores data for various images obtained by the camera 100 and various types of calculation results regarding photometry calculations, focus control, exposure control, and so on.

The memory 132 also contains previously stored information such as programs executed by the camera 100, operational constants, exposure conditions, calculation methods, and program diagrams. The programs executed by the camera 100 are programs providing operations instructions similar to the flows illustrated in FIGS. 3 and 5.

A timing generating unit 143 is a timing generating unit that outputs operational timings to each unit in the camera 100. The timing generating unit 143 is controlled by the CPU 131 connected via the bus 150, and controls each of the operational timing for the imaging device 105, the AFE 106, and the video signal processing unit 121.

In addition to the configuration units previously described, the lens drive unit 141, the shutter drive unit 142, a power supply 110, the memory 132, a display control unit 151, a card input/output unit 171, and various types of switches are connected to the bus 150.

The aforementioned various types of switches include a main switch 161, a first release switch 162, a second release switch 163, a live view start/stop button 164, a moving image record start/stop button 165, a vertical and horizontal selection button 166, and a set button 167.

The power supply 110 supplies power via the bus 150 to each circuit provisioned internally to the camera 100.

The CPU 131 is a control unit (setting unit) that centrally controls each unit in the camera 100. For example, the CPU 131 reads image data imaged by the imaging device 105, controls operations within the video signal processing unit 121, controls operational timing of the memory 132, performs drive control of the lens drive unit 141 and the shutter drive unit 142, and so on. The CPU 131 also executes the aforementioned control be reading and executing a predetermined program stored in the memory 132.

The display control unit 151 is a display control unit that controls the display of displayable analog image data on a display unit 153 such as a thin-film transistor (TFT) display made from liquid crystal display elements and other external display units not illustrated. The display control unit 151 converts the displayable image data stored in the memory 132 from the digital image data into displayable analog image data via a D/A conversion unit 152, under control of the CPU 131. The display control unit 151 displays the converted analog image data to the display unit 153 or to an external display unit (not illustrated) via a cable and a video output terminal 154 or HDMI output terminal 155.

The image data obtained by the imaging device 105 is processed variously by the AFE and video signal processing unit 121 before being temporarily stored in video random access memory (VRAM) of the memory 132. The display control unit 151 reads displayable digital image data from the VRAM of the memory 132 in accordance with instructions from the CPU 131. The display control unit 151 can display a recorded moving image and live view by executing the previously described processing and continually updating the displayable images to the display unit 153.

A removable recording medium 173 such as an SD card, for example, can be inserted into a card slot 172. When the recording medium 173 is inserted into the card slot 172, the recording medium 173 is electrically connected to the card input/output unit 171.

The image data recorded to the memory 132 can then be recorded to the recording medium 173. The data recorded within the recording medium 173 can also be read by the camera 100.

Basic Operation of Device

Hereafter, the operations related to imaging the subject with the camera 100 according to the present embodiment will be described with reference to FIG. 1. After the main switch 161 is turned on by the user, the CPU 131 executes the predetermined program stored in the memory 132, and supplies power to each unit configuring the camera 100.

After power is supplied to each unit configuring the camera 100, for example, instructions from the CPU 131 are sent to the shutter drive unit 142 to open the shutter 104, and then the optical image of the subject guided by the lens 101 is formed on the imaging device 105. In addition, a graphical user interface (hereinafter, referred to as GUI) for setting various parameters is displayed on the display unit 153.

The first release switch 162 turns on by the first stroke (pressed halfway) of the release button (not illustrated). According to the present embodiment, the preparation to shoot the subject starts upon the user first turning on the first release switch 162 of the release button (not illustrated).

More specifically, the lens drive unit 141 executes control as necessary such as for the focus operation and zoom operation of the lens 101, and for driving the diaphragm 102 in accordance with instructions from the CPU 131 via the bus 150.

The second release switch 163 turns on by the second stroke (pressed fully) of the release button (not illustrated). With the second release switch turned on, the CPU 131 controls the drive of the shutter drive unit 142 on the basis of accumulated start timing previously determined by the timing generating unit 143. Then, the subject is shot by the opening and closing of the shutter 104 by the shutter drive unit 142.

Various parameters displayed on the GUI can be selected and set by subsequent user operation of the vertical and horizontal selection button 166 and the determination button 167. In addition, modes can be switched between a moving image shooting mode that does not perform HDR composite processing (first mode) and a moving image shooting mode that does perform HDR composite processing (second mode). Hereinafter, the first mode will be referred to as the normal moving image mode, and the second mode will be referred to as the moving image HDR mode in the description.

When the user presses the live view start/stop button 164, the CPU 131 periodically obtains image data from the imaging device 105 (for example, 60 times per second), executes various types of processing, and arranges this in the VRAM of the memory 132.

As a result, a sequential display (live view) of images obtained from the imaging device 105 can be viewed on the display unit 153. Instead of instructing the start of live view via a button or similar, the configuration may start the live view simultaneously when the main switch 161 is turned on.

When the user presses the moving image record start/stop button 165 during the live view, moving image recording starts or stops. According to the present embodiment, moving image recording starts or stops by user operation of the moving image record start/stop button 165 during the live view, but the present invention is not limited thusly. For example, the configuration may simultaneously start the live view on the display unit 153 and recording of moving images by operating the moving image record start/stop button 165 when the live view is not in operation.

HDR Compositing Operation

Hereafter, the HDR composite processing according to the present embodiment will be described. Generally, when imaging a subject during moving image shooting, the exposure amount changes following changes in luminance. In this case, exposure conditions such as the aperture value, gain amount, accumulation time, and so on updates in accordance with the change in luminance of the subject in the imaging apparatus. That is to say, exposure control is executed following changes in luminance of the subject. This exposure control is exemplary of exposure control following changes in luminance.

When performing HDR composite processing, correct exposure images in which the exposure amount corresponds to average brightness of the subject and underexposed images in which the exposure amount is relatively less than the correct exposure are shot. This exposure control is exemplary of HDR exposure control.

According to the present embodiment, images used for compositing (HRD composite processing) are referred to as compositing images. For example, according to the present embodiment, correct exposure images (second image) shot at correct exposure and underexposed images (first image) shot at underexposure become the compositing images. That is to say, the underexposed images (first images) and the correct exposure images (second images) are images used for compositing, and the underexposed image and the correct exposure image is one set of images used for compositing.

The correct exposure image (second image) has a larger (greater) exposure amount than the exposure amount of the underexposed image (first image). These compositing images are controlled by the CPU (control unit) 131 so as to be continually and periodically shot by the imaging device 105 in order from the underexposed image. That is to say, the CPU 131, which is the control unit, controls the imaging device 105 so that the correct exposure image (second image) is output after the underexposed image (first image) is output.

In this way, an image (composite image) with expanded dynamic range as compared with the output of only the correct exposure image (normal mode) can be obtained by compositing the correct exposure image and the underexposed image imaged (output).

HDR mode is the mode in which underexposed images and correct exposure images are continuously output as the images used for compositing, and moving image shooting mode is the mode in which the correct exposure images are continuously output as images not used for compositing.

When performing HDR composite processing during the recording of moving images, that is to say, during the moving image HDR mode, the exposure control following changes in luminance as previously described and the exposure control for HDR are preferably performed simultaneously. Therefore, while performing HDR composite processing during moving image HDR mode, the exposure control following changes in luminance has to be performed when such changes in luminance in the subject occur.

The present embodiment is described using a case in which the exposure control following changes in luminance is performed particularly when the diaphragm 102 is changed (driven).

For example, when the luminance of the subject changes from dark to bright, the diaphragm 102 changes from the so-called opening side to the closed side. In this case, the relative relationship of the exposure amounts between the continuously output underexposed images and correct exposure images is no longer maintainable when the diaphragm 102 is changed (driven). Specifically, the relative relationship of the exposure amounts between the underexposed images and the correct exposure images imaged when the diaphragm 102 is driven and the relative relationship of the exposure amounts between the underexposed images and the correct exposure images imaged when the diaphragm 102 is not driven are no longer maintainable. That is to say, a problem occurs in which the relative (size of) exposure amounts between the compositing images switches.

Figure 3B:
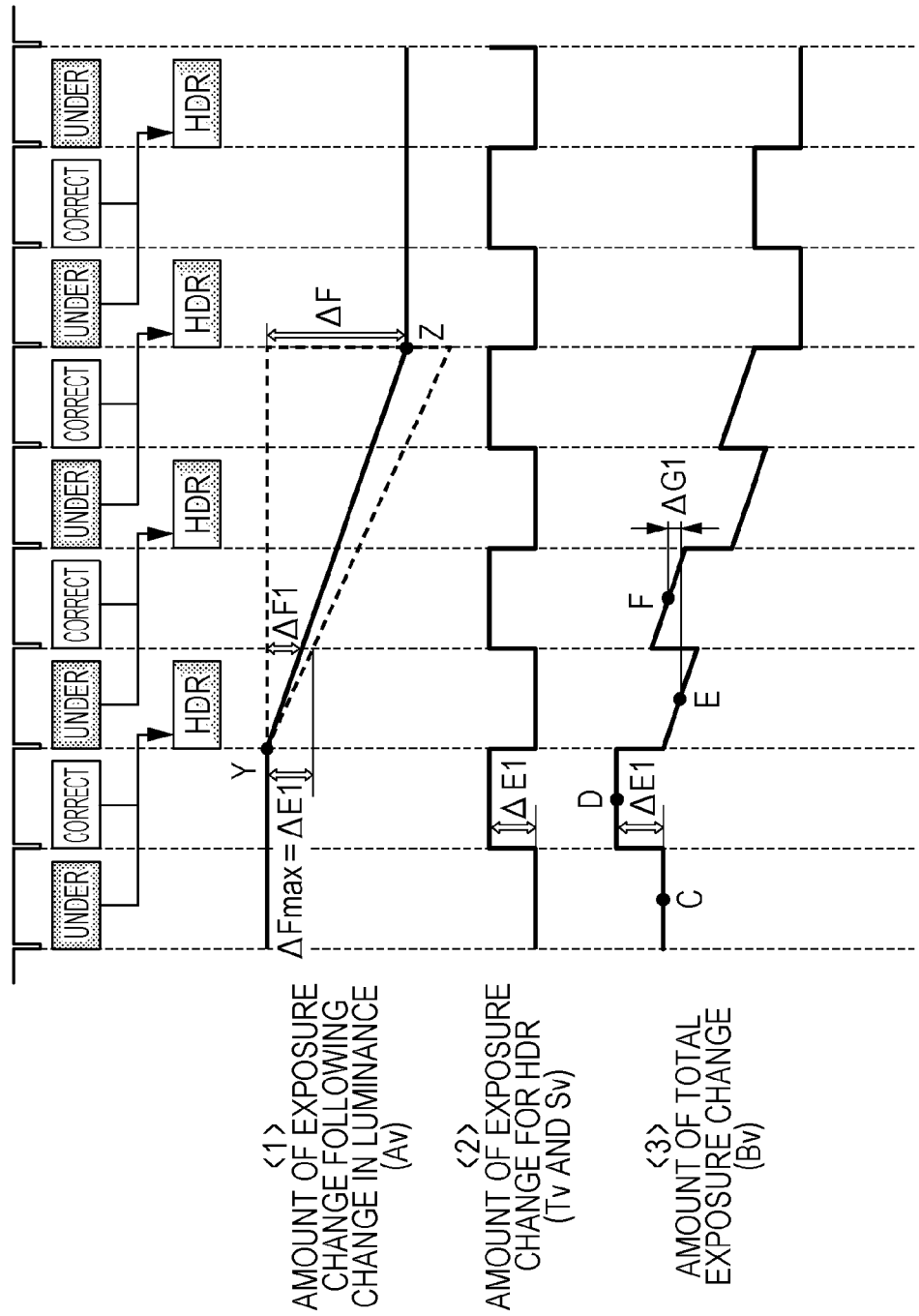
Figure 3C:
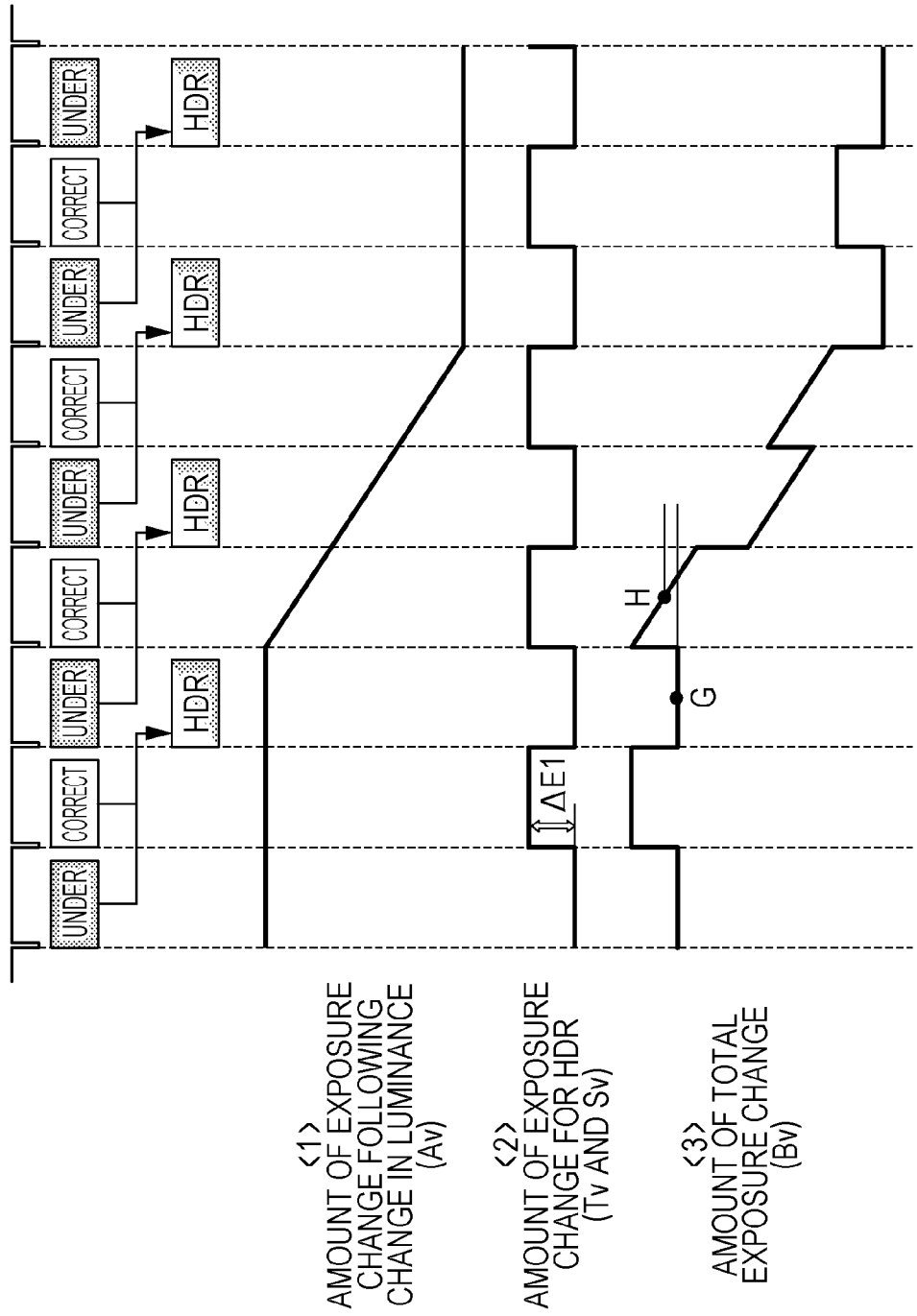

Hereafter, the aforementioned problem will be described with reference to FIGS. 3A through 3C. FIGS. 3A through 3C are timing charts illustrating continuous changes in exposure amounts and various types of exposure timings according to the present embodiment. In FIGS. 3A through 3C, <1> represents changes in exposure amounts from exposure control following changes in luminance. <2> represents changes in exposure amounts by exposure control for HDR. <3> represents changes in exposure amounts in total for the imaging apparatus during moving image HDR mode.

FIG. 3A is a timing chart illustrating the case when the relative exposure amounts are switched as previously described. FIGS. 3B and 3C are timing charts illustrating changes depending on conditions that are described later.

From looking at FIG. 3A, it can be observed that the exposure amount for point A which represents the average exposure amount for underexposed images during diaphragm drive is smaller (less than) the exposure amount for point B which represents the average exposure amount for correct exposure images during diaphragm drive. That is to say, the relative exposure amounts between the compositing images have switched from that initially intended.

Gamma correction, sampling, and other processing conducted after obtaining the compositing images is performed depending on these compositing images, and so there is a problem in that HDR composite processing is not correctly performed when in this state.

Thus, according to the present embodiment, the aforementioned problem is resolved by driving the diaphragm minutely. The minute driving of the diaphragm is implemented by controlling the power that flows to the coils of a stepping motor in stages, and using a lens capable of micro step diaphragm drive to finely control the diaphragm diameter.

Specifically, the difference between the exposure amount of the underexposed images and the correct exposure images is set so that the relative relationship between the exposure amount for underexposed images (hereinafter, referred to as underexposure) and the exposure amount for correct exposure images (hereinafter, referred to as correct exposure) for one set of compositing is corrected. The aforementioned problem is resolved by controlling the diaphragm drive (resulting change in exposure amount) for setting the difference in exposure amounts between the underexposed images and the correct exposure images. That is to say, the difference in exposure between the underexposed images and the correct exposure images are set by the CPU 131, which is the setting unit, controlling operation of a shutter drive unit 14 which controls the drive of the diaphragm 102 which is a light amount adjusting member. The difference in exposure between the underexposed images and the correct exposure images represents the amount of change in the exposure amount during the imaging of the underexposed images and the correct exposure images.

Figure 4:
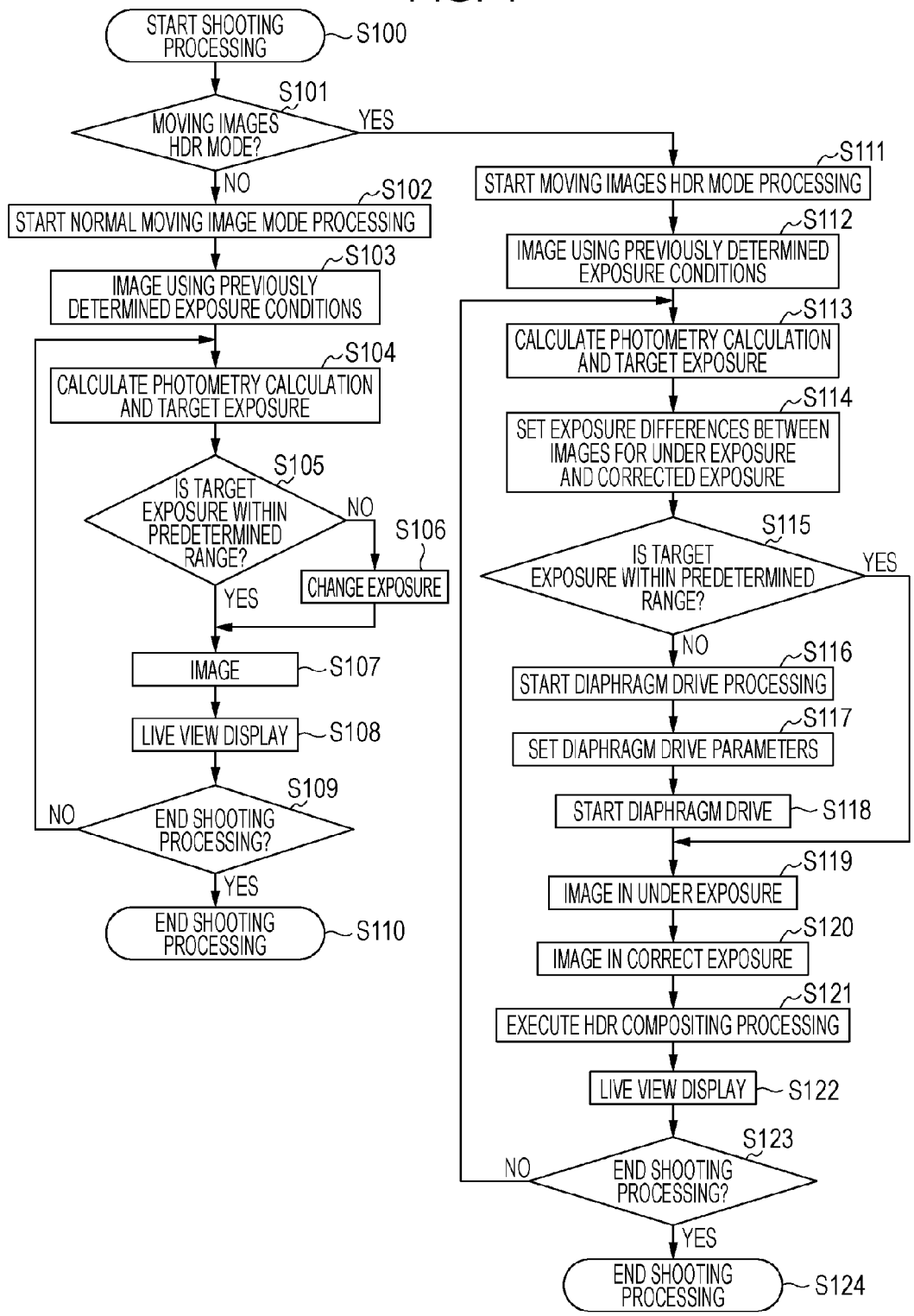
FIG. 4 is a flowchart describing an example of an operation process of the imaging apparatus according to the First Embodiment of the present invention.

Hereafter, the operation of the imaging apparatus according to the present embodiment will be described with reference to the flow illustrated in FIG. 4. Each step of the operation regarding the flow illustrated in FIG. 4 is implemented by the CPU 131 provisioned within the camera 100 executing a program stored within the memory 132.

Before shooting processing begins, preparation related to shooting, such as focusing on the subject is completed by operating the units configuring the previously described camera 100.

The flow illustrated in FIG. 4 will now be described. First, at step S100, the CPU 131 detects that the live view start/stop button 164 has been pressed and starts the shooting processing.

Next, at step S101, the CPU 131 determines whether or not the moving image mode selected by the user is the moving image HDR mode. When the mode is not the moving image HDR mode (second mode), the mode is determined to be the normal moving image mode (first mode), and processing proceeds to step S102. When the mode is the moving image HDR mode, processing proceeds to step S111.

Hereafter, the flow regarding the operation of the normal moving image mode (first mode) will be described. At step S102, the CPU 131 instructs the imaging device 105 and the display control unit 151 to start operation, and then starts control for the normal moving image mode.

Next, at step S103, the CPU 131 images the preliminary image at the previously determined exposing conditions stored within the memory 132. The preliminary image shooting conditions may be any typically used conditions. According to the present embodiment, the preliminary image is only used for the photometry calculation described later, and so it is not recorded to the memory 132 or other storage medium, but the configuration may also perform such recording.

Next, at step S104, the CPU 131 instructs the photometry calculating unit 201 to perform the photometry calculation on the previously obtained preliminary image, and then calculates the target exposure from the result.

The target exposure according to the present embodiment is the correct exposure in accordance with the brightness of the subject calculated from the result of the photometry calculation. According to the present embodiment, the target exposure is calculated on the basis of the program diagram illustrated in FIG. 5.

Figure 5:
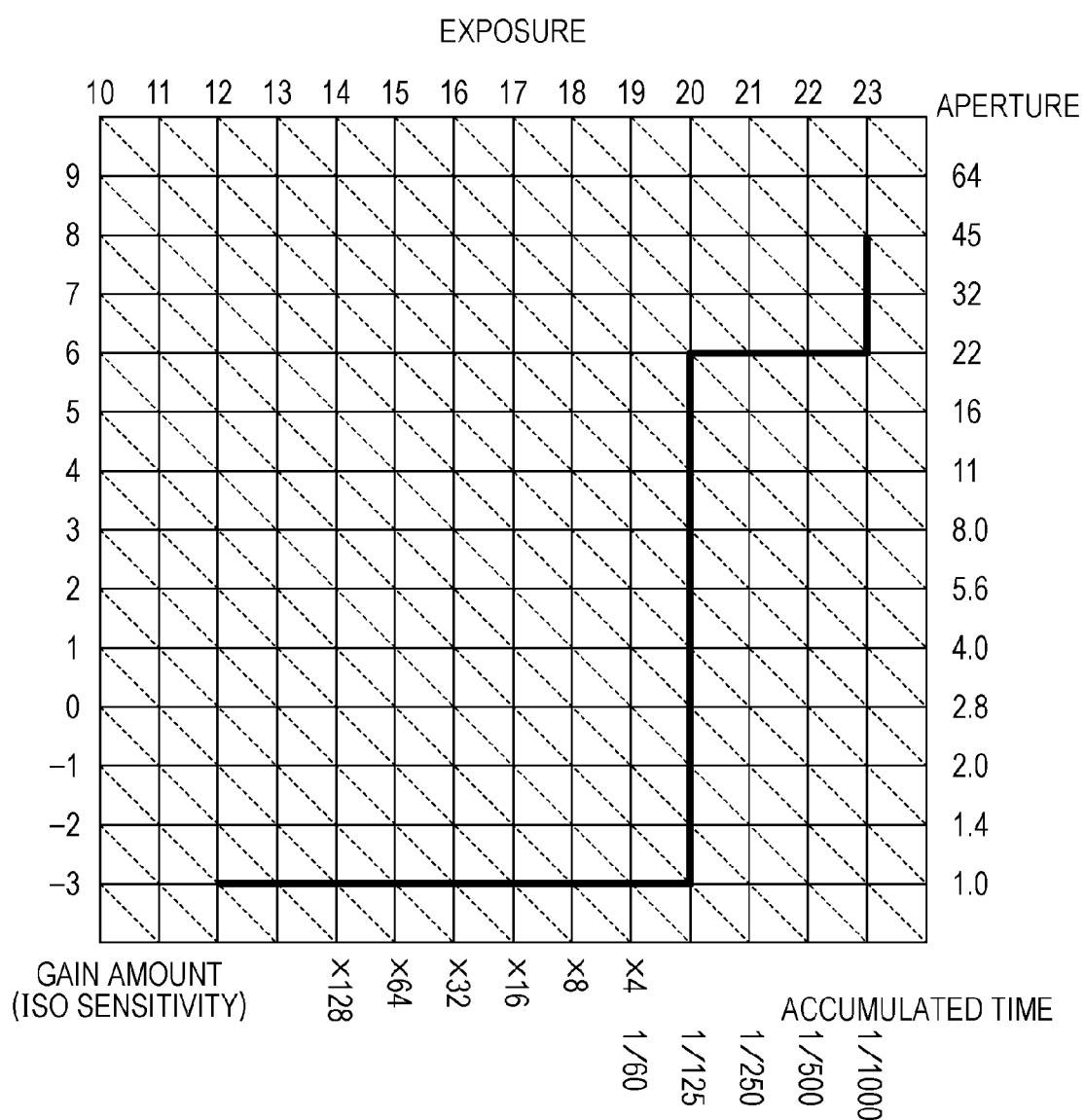
FIG. 5 is a program diagram describing an example program related to the exposure control in the imaging apparatus according to the First Embodiment of the present invention.

The program diagram in FIG. 5 is an example program diagram illustrating the relationship between the aperture, accumulation time, and gain amount during the shooting of moving images according to the present embodiment. The upper horizontal axis and the left vertical axis represent the shooting exposure, the lower horizontal axis represents the accumulation time and gain amount, and the right vertical axis represents the aperture value.

The configuration may allow the target exposure to be configured as desired by the user. In this case, the configuration would not perform the processes at steps S103 and S104 to determine the desired exposure.

Next, at step S105, the CPU 131 determines whether or not the previously calculated target exposure is within a predetermined range described later. When the target exposure is within the predetermined range, processing proceeds to step S107. When the target exposure is outside the predetermined range, processing proceeds to step S106.

Generally, exposure control is performed so that the exposure actually used in shooting (shooting exposure) follows the target exposure. However, the exposure changes frequently if the shooting exposure excessively follows the target exposure. This state produces a negative effect of making it difficult to determine the shooting exposure.

According to the present embodiment, the predetermined range functioning as the shooting exposure reference (blind zone) has been established to prevent the previously described negative effect. The determination on whether or not to change the exposure conditions is based on whether or not the target exposure is within the predetermined range functioning as the shooting exposure reference.

According to the present embodiment, the predetermined range is determined from the dynamic range of the imaging device 105, the accuracy of calculations output from the photometry calculating unit 201, γ conversion parameters from the development processing unit 202, and so on, but the present invention is not limited thusly.

When the target exposure is outside the set predetermined range, at step S106, the CPU 131 changes the shooting exposure, and then processing proceeds to step S107 after the exposure change completes. According to the present embodiment, the change in shooting exposure is implemented by appropriately changing the aperture, accumulation time, and gain amount (ISO sensitivity) on the basis of the program diagram illustrated in FIG. 5.

Next, at step S107, the CPU 131 images the subject for the image displayed on the display unit 153 (display image) via the imaging device 105, and obtains the display image. At step S108, the live view of the obtained display image is updated after the display image shooting completes. Live view is started for the first process after the shooting processing starts.

Next, at step S109, the CPU 131 determines whether or not the shooting processing has finished. If finished, processing proceeds to step S110 where the shooting operation is ended, and the live view is terminated.

If the shooting processing is not finished, processing returns to step S104 to start the shooting operation for the next image. This concludes the description of the operation flow for the normal moving image mode.

Hereafter, the flow regarding the operation of the moving image HDR mode (second mode) will be described. At step S101, when the moving image mode selected by the user is determined to be the moving image HDR mode, processing proceeds to step S111, and the CPU 131 instructs the imaging device 105 and the display control unit 151 to start operation, and then starts control for the moving image HDR mode.

Next, at step S112, the CPU 131 images the preliminary image with the previously determined exposing conditions stored within the memory 132. The imaging of the preliminary image is similar to that previously described for the normal moving image mode, and so its description is omitted.

Next, at step S113, the CPU 131 instructs the photometry calculating unit 201 to perform the photometry calculation on the previously obtained preliminary image, and then calculates the target exposure from the result.

The target exposure is determined for the moving image HDR mode in the same way as for the normal moving image mode, which is in accordance with the program diagram illustrated in FIG. 5. The target exposure for the moving image HDR mode here is the correct exposure which will be described later. Therefore, the underexposed image described later is obtained by setting a predetermined difference in exposure from the correct exposure based on the program diagram illustrated in FIG. 5.

Next, at step S114, the CPU 131 sets a fixed difference in exposure between the correct exposure and the underexposure from the result of the photometry calculation. According to the present embodiment, the underexposure is set so that the exposure amount (EV) is two levels (2 Ev) less than the correct exposure, but the present invention is not limited thusly. The fixed difference in exposure set here is the difference in exposure produced by HDR exposure control, and so there are cases in which this fixed difference in exposure changes by driving the diaphragm 102. A feature of the present embodiment is the setting of the difference in the exposure amount between underexposed images and correct exposure images when driving the diaphragm 102 so that the relative relationship of exposure amounts between underexposed images and correct exposure images is the same regarding this fixed difference in exposure. Details will be described later.

According to the present embodiment, the fixed difference in exposure between the correct exposure and the underexposure can be set for each shot by changing either one or both of the gain amount and the accumulation time. Specifically, the CPU (control unit and setting unit) 131 sets the fixed difference in exposure between the underexposed images and the correct exposure images by controlling at least either the accumulation time or the gain amount. That is to say, the exposure control illustrated by <2> in FIGS. 3A through 3C is implemented not by changing the aperture, but by controlling the gain amount and accumulation time by instructions from the CPU 131. The configuration may use a value for the fixed difference in exposure between the correct exposure other than 2 Ev, or may calculate the difference in exposure in accordance with a predetermined expression.

Next, at step S115, the CPU 131 determines whether or not the previously calculated target exposure is within the predetermined range. When the target exposure is within the predetermined range, processing proceeds to step S119.

When the target exposure is determined at step S115 to be outside the predetermined range, processing proceeds to step S116, and the CPU 131 starts the exposure control to drive the diaphragm. The predetermined range for the moving image HDR mode is similar to that for the normal moving image mode.

Next, at step S117, the CPU (setting unit) 131 sets the diaphragm drive parameters. The diaphragm drive processing, which is processing to set the diaphragm drive parameters, will be described later.

According to the present embodiment, the diaphragm drive parameters is a parameter for setting the amount of exposure change per unit image when the lens 101 performs the micro step diaphragm drive via the lens drive unit 141.

Next, at step S118, the CPU 131 starts to drive the diaphragm on the basis of the diaphragm drive parameters set at step S117, and then processing proceeds to step S119.

Next, at step S119, the CPU 131 performs exposure control based on the difference in exposure between the underexposure and correct exposure obtained at step S114. At this time, the exposure amount initially set by the CPU 131 is the underexposure. At this state, the subject is imaged by the imaging device 105 in accordance with instructions from the CPU 131, and then, the CPU 131 obtains the underexposed image.

Next, at step S120, the CPU 131 images the subject for correct exposure image in the same way as when obtaining the underexposed image.

According to the present embodiment, the correct exposure image is obtained (imaged) after the underexposed image is obtained (imaged). This is because the timing to read the electrical charge from the imaging device 105 is periodic, and the timing to start the accumulation of an electrical charge is set to be reversely calculated from the readout timing.

As the accumulation time for the underexposed image is shorter than for the correct exposure image, when starting with the imaging of the correct exposure image, for example, the interval in which no electrical charge is accumulated between the correct exposure image and the underexposed image is increased (longer period). In this case, the amount of deviation of the subject between the correct exposure image and the underexposed image increases when performing HDR composite processing, which may result in instances of the composited image being blurry.

Therefore, according to the present embodiment, the subject is imaged in sequence from the underexposed image to the correct exposure image. However, the configuration may also perform imaging in sequence from the correct exposure image to the underexposed image. In particular, it is not necessary to restrict the imaging sequence when the subject does not move more than a predetermined amount.

Next, at step S121, the CPU 131 composites the underexposed image and the correct exposure image in the compositing unit (compositing unit) 204 and performs the HDR composite processing. Specifically, each compositing image is divided into multiple blocks, and the positioning of the compositing images for predetermined pixels within the block is determined by comparing the correct exposure image and the underexposed image. Next, the luminance values for each predetermined pixel in the compositing images are added to calculate the average luminance value. Then, the image is scanned for black defect luminance regions and halation luminance regions to determine whether or not the added average brightness value exceeds a predetermined threshold. Then, any detected black defect regions and halation defect regions are excluded from pixels from the compositing images (exclusion processing). These operations are performed on both the correct exposure image and the underexposed image, which are the compositing images. Finally, using the luminance level of the correct exposure image as a reference, the luminance level for the compositing images is adjusted, and then compositing of the correct exposure image and the underexposed image is executed in accordance with a predetermined compositing ratio generates the composite image. The composite image has a wider dynamic range than the either the underexposed image or the correct exposure image.

These operations are implemented in the compositing unit 204 by the CPU 131 executing the predetermined program stored in the memory 132. Regarding the imaging apparatus according to the present embodiment, the composite processing is not limited to the previously described operations, and may be performed, for example, by additionally averaging the compositing images.

At step S122, the CPU 131 performs the live view of the composite image obtained by compositing.

Next, at step S123, the CPU 131 determines whether or not the shooting processing is finished. When the shooting processing is finished, processing proceeds to step S124 terminating the shooting processing and the live view. If the shooting processing is not finished, processing proceeds to step S113, and the CPU 131 performs the shooting processing operations for the next frame. This concludes the description of the operation flow for the moving image HDR mode.

Procedure to Determine the Diaphragm Drive Parameters

Hereafter, the diaphragm drive processing performed when the CPU 131 determines that the target exposure is outside the predetermined range (blind zone) at step S115 described above will be described with reference to FIGS. 3A through 3C and FIG. 6.

Figure 6:
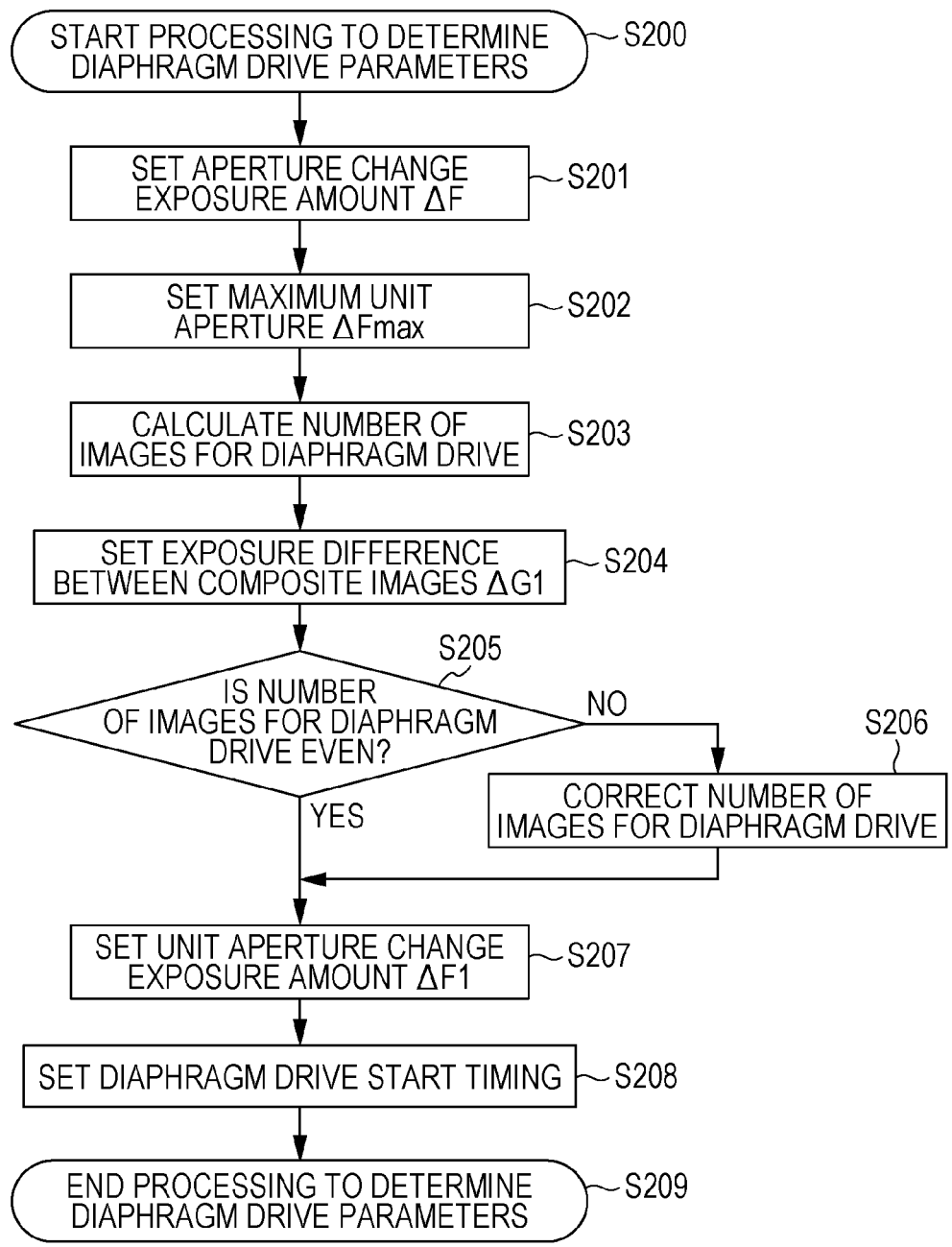
FIG. 6 is a flowchart illustrating an example of processing to determine a diaphragm drive parameters for the imaging apparatus according to the First Embodiment of the present invention.

FIG. 6 is a diagram illustrating a flow for setting the diaphragm drive parameters for driving the diaphragm in accordance with changes in the luminance of the subject. Each step of the operation regarding the flow illustrated in FIG. 6 is implemented by the CPU 131 provisioned within the camera 100 executing a program stored within the memory 132.

The diaphragm drive parameters according to the present embodiment specifies the aperture change exposure amount $\Delta F$, the maximum unit aperture $\Delta Fmax$, the number of images for diaphragm drive, the exposure difference between compositing images $\Delta G1$ during diaphragm drive, the unit aperture change exposure amount $\Delta F1$, and the diaphragm drive start timing. Details on these parameters will be described later.

The aperture change exposure amount $\Delta F$ here is the exposure amount that changes from diaphragm drive while driving the diaphragm. The maximum unit aperture $\Delta Fmax$ is the maximum exposure amount that changes from driving the diaphragm per unit image. The unit aperture change exposure amount $\Delta F1$ is the exposure amount that actually changes from driving the diaphragm per unit image.

As illustrated in FIG. 6, at step S200, the processing to determine the diaphragm drive parameters starts. At step S201, the CPU 131 sets the necessary aperture change exposure amount $\Delta F$ from the difference in the target exposure and the current shooting exposure.

Next, at step S202, the CPU 131 sets the maximum unit aperture $\Delta Fmax$ on the basis of the exposure difference $\Delta E1$ between the correct exposure and the underexposure, which are the compositing exposures. Specifically, the maximum unit aperture $\Delta Fmax$ is set less than the $\Delta E1$ ($\Delta Fmax < \Delta E1$). The exposure difference $\Delta E1$ is the previously described fixed difference in exposure. According to the present embodiment, the exposure difference $\Delta E1$ is an absolute value of the difference in the exposure amount between the underexposure and correct exposure output, which is continually and periodically output as a set used for compositing. That is to say, the difference in the exposure amount between the underexposed image and the correct exposure image imaged when the lens drive unit 141 is operated is set within a range of absolute values for the difference in the exposure amount between the underexposed image and the correct exposure image imaged when the lens drive unit 141 is not operated. The lens drive unit 141 drives the diaphragm 102 in accordance with the set difference in the exposure amount between the underexposed image and the correct exposure image.

According to the present embodiment, the upper limit to the diaphragm drive (maximum unit aperture) is established to prevent the relative relationship in the exposure amount between the underexposure and the correct exposure from reversing during diaphragm drive. That is to say, the diaphragm drive is set so that the relative relationship in the exposure amount between the underexposed image and the correct exposure image from image to image when the diaphragm is not driven stays the same (is maintained) when the diaphragm is driven.

Therefore, the amount of change in exposure per unit image by driving the diaphragm for the moving image HDR mode is reduced as compared to that for the normal moving image mode. That is to say, the CPU 131 can control the diaphragm drive during the moving image HDR mode to be changed more slowly than during the normal moving image mode by setting the previously described maximum exposure amount $\Delta Fmax$ smaller than the $\Delta E1$.

This configuration may also be viewed from the perspective of the operational level of the lens drive unit 141. As a premise, the operational level (level of light amount adjustment) of the lens drive unit 141 when driving the diaphragm 102 during the moving image shooting mode is a first level, and the level of light amount adjustment during moving image HDR mode is a second level. The light amount adjustment level can be appropriately set by the CPU 131, which is a setting unit.

As previously described and according to the present embodiment, the CPU 131 sets this so that the drive amount of the diaphragm 102 per unit time is smaller for the moving image HDR mode than the moving image shooting mode. That is to say, the CPU 131 can maintain the relative relationship of the exposure amount between the underexposed image and the correct exposure image when the diaphragm is not driven even while driving the diaphragm by setting the level of the light amount adjustment so that the second level is less than the first level. The second level is the operational level (level of light amount adjustment) of the lens drive unit 141 that has smaller changes in the exposure amount per unit time than the first level.

With the previously described processing, the relative relationship (relative relationship between point E and point F) of the exposure amount between the compositing images when the diaphragm is driven as illustrated in FIG. 3B is maintained for the exposure amount between the compositing images when the diaphragm is not driven (relative relationship between point C and point D). That is to say, the relative relationship of the exposure amount between the compositing images does not switch.

FIG. 3B is a timing chart illustrating continuous changes in exposure amounts and various types of exposure control timings when controlling the drive of the diaphragm regarding the imaging apparatus according to the present embodiment. Points C through F represent average exposure amounts of positioned compositing images. The previously described relative relationship of the exposure amount represents the relationship regarding how large or small the exposure amount is. The difference in exposure amounts is not normally maintained for both states when the diaphragm is driven and states when the diaphragm is not driven. Regarding the present embodiment, for example, the difference in exposure from point C to point D and the difference in exposure from point E to point F in FIG. 3B do not have to be the same. In this case, the relative relationship of the exposure amount between point E to point F in FIG. 3B is same as the relative relationship of the exposure amount between point C to point D in FIG. 3B.

The relative relationship of the exposure amount according to the present embodiment is the relationship when comparing the underexposed images and correct exposure images periodically and continuously output as one set used for compositing. That is to say, this is the relative relationship of the exposure amount between the compositing images when comparing the exposure amount for the set of compositing images such as represented by point C and point D in FIG. 3B.

Returning to FIG. 6, at step S203, the CPU 131 calculates the number of compositing images in which diaphragm drive is performed (number of images for diaphragm drive) as $\Delta F / \Delta Fmax$.

Next, at step S204, the CPU 131 sets the exposure difference between compositing images $\Delta G1$ during diaphragm drive. According to the present embodiment, the difference in exposure between the compositing images is established to maintain a certain minimum HDR composite processing effect even while the diaphragm is driven.

For example, normally when the difference in exposure between compositing images having differences in exposure of 2 Ev is reduced by the diaphragm drive, the exposure amount between the compositing images is nearly the same. If HDR composite processing is performed on the compositing images in this state, the effect of expanded dynamic range becomes diluted.

Thus, according to the present embodiment and as previously described, exposure control is performed so that the difference in exposure is at least a constant value between the compositing images. Specifically, the diaphragm drive is controlled so that the exposure difference between compositing images $\Delta G1$ during diaphragm drive is at least half of that compared to the normal state ($\Delta G1 = \Delta E \frac{1}{2}$). With such a configuration, composite images in which a certain minimum HDR composite processing effect is maintained during diaphragm drive can be obtained.

Returning to the flow in FIG. 6, at step S205, the CPU 131 determines whether or not the number of images for diaphragm drive calculated at step S203 is even.

When the number of images for diaphragm drive calculated at step S203 is determined at step S205 to not be even, at step S206, the CPU 131 adds an image in which diaphragm drive is performed to the calculated number of images for diaphragm drive. That is to say, when the number of images for diaphragm drive is odd, the number of images for diaphragm drive is corrected to an even number by adding one image in which diaphragm drive is performed.

By making the number of images for diaphragm drive even, this is to prevent diaphragm drive from being performed for only either the underexposed image or the correct exposure image in this combination, which causes the HDR composite processing to be performed incorrectly. That is to say, the difference in exposure between the underexposed image and the correct exposure image is set so that the number of images output from the imaging device 105 while the diaphragm is driven (number of images for diaphragm drive) is a multiple of the number of images used for compositing (number of compositing images).

Next, at step S207, from the previously determined aperture change exposure amount ΔF and the number of images for drive, the CPU 131 sets the amount of exposure change per unit aperture ΔF1, which is the exposure amount changed by the diaphragm drive per actual image in the compositing images.

Next, at step S208, the CPU 131 sets the diaphragm drive start timing, which is the timing to start the diaphragm drive, so that the diaphragm drive starts from the underexposed image in the set of compositing images used for compositing. According to the present embodiment and as illustrated in FIG. 3B, for example, compositing is performed in sequence from the underexposed image to the correct exposure image, and so the position represented by point Y in FIG. 3B is the diaphragm drive start timing.

As previously described, at steps S205 and S206, the number of images for diaphragm drive is set to be even, and so the timing to finish the diaphragm drive (diaphragm drive end timing) is the position of point Z in FIG. 3B.

FIG. 3C is a timing chart illustrating continuous changes in exposure amounts and various types of exposure timings when the diaphragm drive start timing does not match the image being images as the compositing image. Points G and H in FIG. 3C represent average exposure amounts of compositing images. Here, there is a potential that the HDR compositing is not performed correctly by compositing the images at point G, which is an underexposed image with no diaphragm drive, and at point H, which is a correct exposure image with diaphragm drive. For example, if one of the images used for compositing is an image with diaphragm drive, the exposure amount does not change for a constant amount between compositing images, a problem surfaces in which adjustments such as positioning between the compositing images or the luminance level are not performed correctly.

Therefore, according to the present embodiment and as previously described, the compositing images are combined as a set, and the diaphragm drive timing is set to perform diaphragm drive on the set. Specifically, the CPU 131 starts to obtain the underexposed image, which is obtained first, while simultaneously starting the diaphragm drive, and stops obtaining the correct exposure image, which is obtained afterwards, while simultaneously stopping the diaphragm drive. That is to say, the CPU 131 controls the drive of the diaphragm 102 so that the drive of the diaphragm 102 is started together with the timing to start the imaging of the underexposed image, and the drive of the diaphragm 102 ends together with the timing to end the imaging of the correct exposure image.

After the diaphragm drive timing is set at step S208, at step S209, the CPU 131 stops the processing to set the diaphragm drive parameters. This concludes the description of the flow to configure the diaphragm drive parameters.

After the diaphragm drive parameters are set, the drive of the diaphragm 102 is started in accordance with the determined diaphragm drive parameters at step S118 in FIG. 4. Therefore, compositing images can be consecutively obtained with conditions enabling the HDR composite processing to be performed correctly during moving image shooting mode during the subsequent steps.

As previously described, according to the imaging apparatus regarding the present embodiment, HDR composite processing can be performed correctly while exposure control following changes in luminance of the subject is performed even when performing HDR composite processing while shooting moving images in the moving image HDR mode.

The control of the diaphragm drive according to the present embodiment calculates the unit diaphragm drive amount on the basis of the calculated diaphragm drive amount and the number of images for diaphragm drive, and so the unit diaphragm drive amount is normally constant during the drive of one diaphragm. However, the present embodiment is not limited thusly, and the configuration may perform photometry calculations during diaphragm drive and constantly reflect the results thereof in the diaphragm drive.

According to the present embodiment, a configuration has been described in which the exposure difference between compositing images ΔG1 is set, but the present invention is not limited thusly. For example, an arrangement may be made where the configuration does not perform the processing of step S204 in FIG. 6.

According to the present embodiment, the configuration composites images having different exposures as previously described, but the present invention is not limited thusly. For example, the configuration may perform the compositing with an external device (not illustrated) provisioned externally to the camera 100.

Second Embodiment

According to the previously described First Embodiment, the configuration described correctly performs HDR composite processing while performing exposure control following changes in luminance of the subject by controlling the diaphragm drive. According to the present embodiment, a configuration which controls the accumulation time and gain amount instead of controlling the diaphragm drive will be described with reference to FIG. 7.

Figure 7:
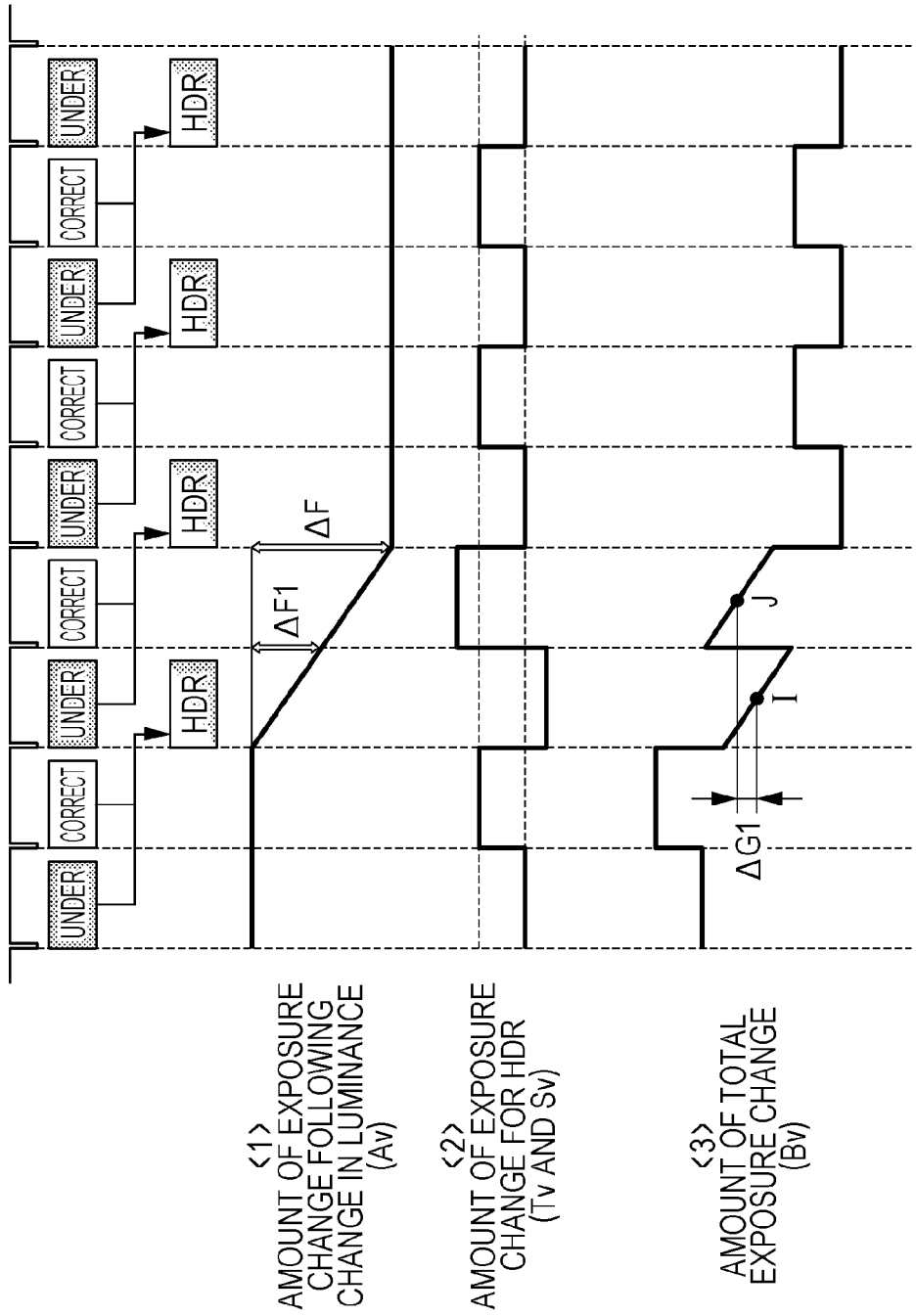
FIG. 7 is a timing chart illustrating example timings of exposure control in the imaging apparatus according to a Second Embodiment of the present invention.

FIG. 7 is a timing chart illustrating continuous changes in exposure amounts and exposure control timings when controlling the accumulation time and gain amount during diaphragm drive. Points I and J in FIG. 7 represent average exposure amounts for the corresponding underexposed image and correct exposure image.

According to the present embodiment, the CPU 131, which is the control unit, controls the accumulation time and the gain amount when driving the diaphragm in order to maintain the relative relationship of the exposure amount between compositing images when not driving the diaphragm during diaphragm drive.

Specifically, the exposure amounts from controlling the accumulation time and the gain amount correspond by reducing the exposure amount for underexposure and increasing for correct exposure during diaphragm drive as compared with when the diaphragm is not being driven. That is to say, the exposure amount for point I, which is the during diaphragm drive, in FIG. 7 is reduced from that when not driving the diaphragm, and the exposure amount for point J is increased over that when not driving the diaphragm. According to this configuration, the exposure amount between points I and J can maintain the relative relationship of the exposure amount between the compositing images when not driving the diaphragm. Hereafter, the operation regarding this configuration will be described with reference to the flow in FIG. 8.

Figure 8:
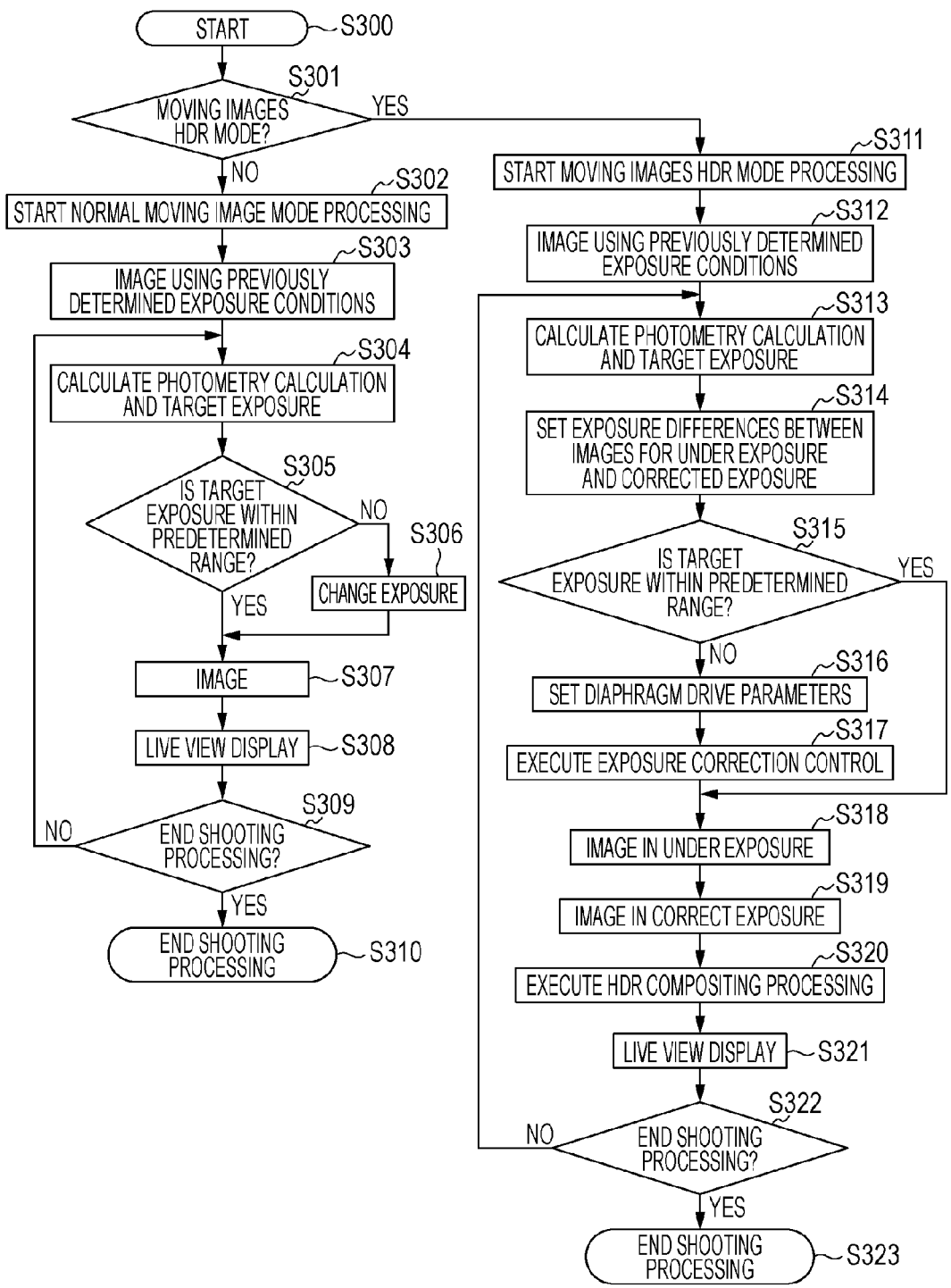
FIG. 8 is a flowchart describing an example of an operation process of the imaging apparatus according to the Second Embodiment of the present invention.

FIG. 8 is a flowchart illustrating the operation of the imaging apparatus according to the present embodiment. Each step of the operation regarding the flow illustrated in FIG. 8 is implemented by the CPU 131 provisioned within the camera 100 executing a program stored within the memory 132.

Regarding FIG. 8, before shooting processing begins, preparation related to shooting is completed by operating the units configuring the previously described camera 100. At step S300, the CPU 131 detects that the live view start/stop button 164 has been pressed and starts the shooting processing.

Next, at step S301, the CPU 131 determines whether or not the moving image mode selected by the user is the moving image HDR mode. When the mode is determined not to be the moving image HDR mode, the normal moving image mode is selected similarly with the previously described First Embodiment. The normal moving image mode according to the present embodiment is similar to that of the previously described First Embodiment, and so its description is omitted.

When it is determined that the moving image HDR mode is set at step S301, processing proceeds to step S311, and the CPU 131 starts the processing related to the HDR moving image shooting mode. Hereafter, the operation until step S315 is similar to that of the previously described First Embodiment, and so its description is omitted.

When the CPU 131 determines that the target exposure is outside the predetermined range at step S315, in step S316 the CPU 131 performs processing to determine the exposure correction amount, which is the corrected exposure amount changing the accumulation time and gain amount so that the target exposure is within the predetermined range.

According to the present embodiment, exposure control follows changes in luminance of the subject similarly to the normal moving image mode. In this case, which is different to the First Embodiment, there is no upper limit (ΔFmax) established on the exposure amount per unit image which changes by driving the diaphragm when the diaphragm is driven following changes in luminance. Therefore, the diaphragm is driven for the moving image HDR mode in the same way as for the normal moving image mode.

According to the present embodiment, the exposure amount is controlled by changing the accumulation time and gain amount instead of controlling the exposure amount which changes from driving the diaphragm. That is to say, the switching of the relative relationship of the exposure amount between compositing images is controlled and the exposure difference between the compositing images is correctly maintained by controlling the accumulation time and gain amount when driving the diaphragm 102. According to this configuration, the relative relationship in the exposure amount between the underexposed image and the correct exposure image imaged when not driving the diaphragm 102 is the same as when driving the diaphragm 102.

According to the present embodiment, controlling the accumulation time and gain amount to correctly maintain the previously described difference in exposure between compositing images, other than for exposure control for HDR, is illustratively referred to as exposure correction processing.

Figure 9:
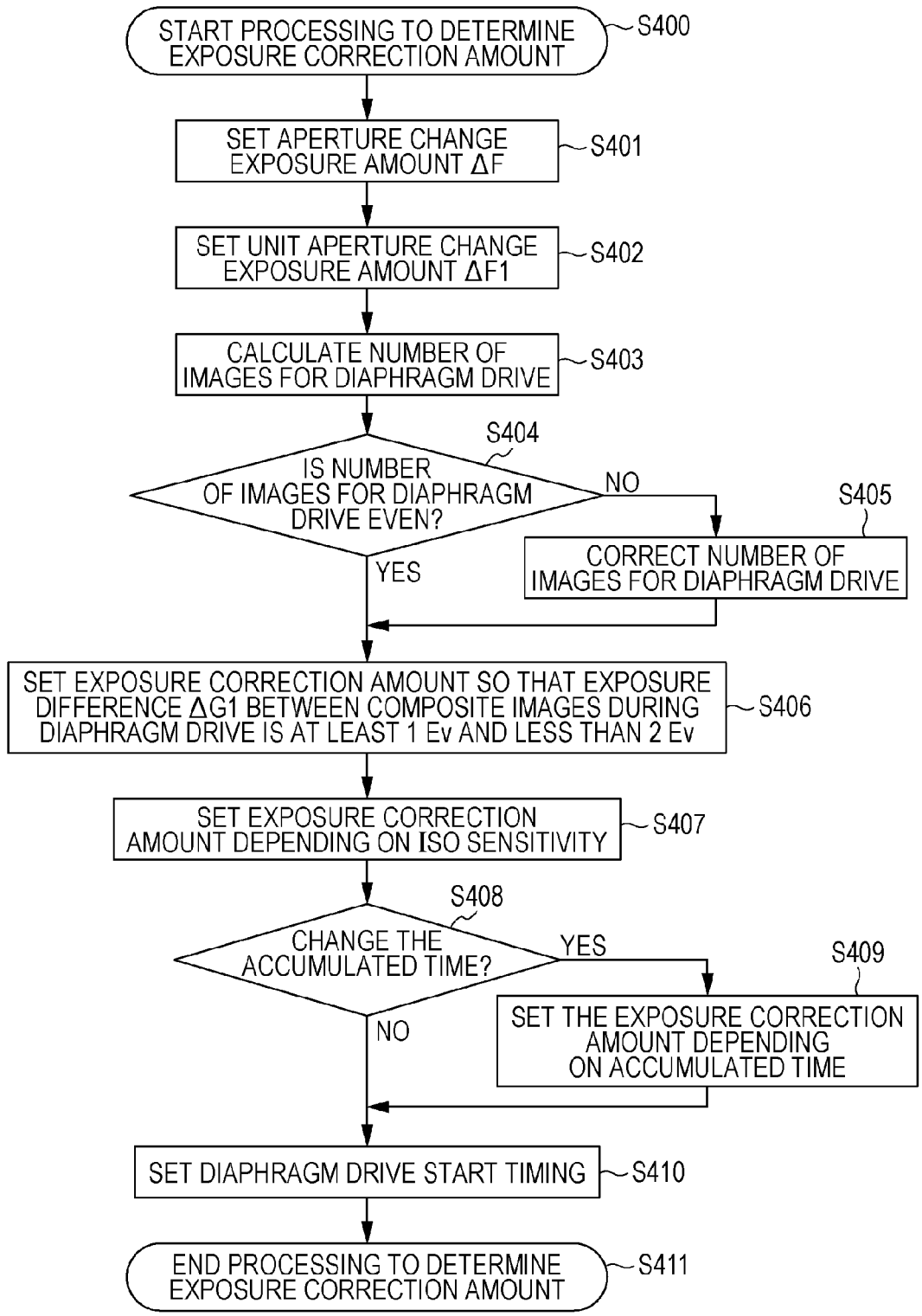
FIG. 9 is a flowchart illustrating an example of processing to determine an amount of exposure correction for the imaging apparatus according to the Second Embodiment of the present invention.

At step S316, the CPU 131 determines the exposure correction amount during the exposure correction control processing. The processing to determine this exposure correction amount will be described with reference to FIG. 9. FIG. 9 is a flowchart illustrating the operation of the processing to determine the exposure correction amount according to the present embodiment. Each step of the operation regarding the flow illustrated in FIG. 9 is implemented by the CPU 131 provisioned within the camera 100 executing a program stored within the memory 132.

At step S400 in FIG. 9, the CPU 131 starts the processing to determine the exposure correction amount. At step S401, the CPU 131 sets the aperture change exposure amount ΔF necessary for following changes in luminance of the subject.

Next, at step S402, the CPU 131 calculates the unit aperture change exposure amount ΔF1. The method to calculate this ΔF1 is not configured to calculate the maximum unit exposure amount ΔFmax as with the previously described First Embodiment, and then adjust the unit diaphragm change exposure amount ΔF1 to be within this range.

Next, at step S403, the CPU 131 calculates the number of images for diaphragm drive from the previously calculated diaphragm change exposure amount ΔF and the unit aperture change exposure amount ΔF1. Specifically, the number of images for diaphragm drive is calculated as ΔF/ΔF1.

After the number of images for diaphragm drive is calculated at step S403, at step S404, the CPU 131 determines whether or not the number of images for diaphragm drive is even. If the number of images for diaphragm drive is even, processing proceeds to step S406, and if the number of images for diaphragm drive is not even, processing proceeds to step S405.

When the number of images for diaphragm drive is determined at step 404 to not be even, at step S405, the CPU 131 performs correction processing so that the number of images for diaphragm drive becomes even.

When the correction of the number of images for diaphragm drive at step S405 is complete, or when the CPU 131 has determined that the number of images for diaphragm drive is even during step S404, processing proceeds to step S406. Then, the CPU 131 determines the exposure amount between the compositing images during diaphragm drive.

According to the present embodiment, the exposure difference between the underexposure and the correct exposure when not performing diaphragm drive is fixed to 2 Ev. The exposure correction amount for correcting the exposure amount is determined by changing the accumulation time and the gain amount so that the difference in exposure ΔG between compositing images during diaphragm drive is at least 1 Ev and less than 2 Ev.

After the exposure correction amount during diaphragm drive is determined at step S406, at step S407, the CPU 131 determines the exposure correction amount by changing the gain amount on the basis of the previously determined exposure correction amount. In this case, the change conditions of the gain amount per image is restricted to a range allowing the gain amount to be changed no more than two levels up or down from the originally set gain, staying within the total number of gain amount levels settable in the camera 100. This is to minimize the effect of noise due to changes in the gain amount. The configuration of the allowable range of the number of levels that the gain amount may be changed is not limited thusly, and may be determined as desired by the user.

Next, at step S408, the CPU 131 determines whether or not the accumulation time has to be changed. As previously described, according to the present embodiment, the number of levels that the gain amount can be changed is previously determined. When further exposure correction control processing is necessary beyond the allowable range where the number of levels that the gain amount can be changed, this exposure correction control processing is performed by changing the accumulation time in addition to the gain amount.

When the CPU 131 determines that it is unnecessary to change the accumulation time at step S408, processing proceeds to step S410.

When the CPU 131 determines that it is necessary to change the accumulation time at step S408, processing proceeds to step S409. In this case, the CPU 131 sets the exposure correction amount from changing the accumulation time on the basis of the previously set exposure correction amount. That is to say, the accumulation time is changed when it is determined that the exposure correction processing is unable to complete within the allowable range that the gain amount can be changed.

Specifically, the exposure amount from changes in the gain amount at step S407 is subtracted from the exposure correction amount determined at step S406 to derive the exposure correction amount from changing the accumulation time. After the exposure correction amount from the accumulation time is set, processing proceeds to step S410.

Next, at step S410, the CPU 131 sets the diaphragm drive start timing. The method to set the diaphragm drive timing is similar to that of the previously described First Embodiment, and so its description is omitted.

Next, at step S411, the CPU 131 finishes the processing to determine the exposure correction amount. This concludes the description of the operation flow to set the exposure correction amount according to the present embodiment.

Returning to FIG. 8, at step S317, the CPU 131 executes the exposure correction control processing with the exposure correction amount determined at step S316. That is to say, the exposure correction amount from the gain amount and the accumulation time is set to match the exposure correction amount for the underexposed image which is imaged first.

Next, at step S318, the CPU 131 images the subject in underexposure in accordance with the diaphragm drive start timing previously determined, and then obtains the underexposure image.

Next, at step S319, the CPU 131 sets the exposure correction amount for the correct exposure image on the basis of the exposure correction amount previously determined, and images the subject in correct exposure. And then, the CPU 131 obtains the correct exposure image.

The operations for the subsequent steps from step S320 are similar to the operation of the previously described First Embodiment. That is to say, the shot underexposed image and the correct exposure image are composited, and the composite image is used as the display image to update the live view.

When the shooting processing operation continues, processing returns to step S313, and the shooting processing operation repeats. When the shooting processing operation is finished, the live view is terminated, and all operations related to shooting processing ends. This concludes the description of the imaging apparatus according to the present embodiment.

As previously described, according to the imaging apparatus regarding the present embodiment, HDR composite processing can be performed correctly while exposure control following changes in luminance of the subject is performed even when performing HDR composite processing while shooting moving images in the moving image HDR mode. The processing to perform the HDR composite processing correctly corresponds to performing exposure control to correct the exposure amount using the accumulation time and gain amount during diaphragm drive.

According to this configuration, the relative relationship when not driving the diaphragm can be maintained during diaphragm drive. The difference in exposure between compositing images is maintained normally by at least a constant level during diaphragm drive, which enables the HDR composite processing effect to be obtained for images after compositing.

According to the present embodiment, exposure control is performed during diaphragm drive by changing the gain amount and the accumulation time instead of controlling the drive of the diaphragm, and so the period in which diaphragm drive is performed can be reduced over that of the First Embodiment.

According to the exposure correction control processing of the present embodiment, the configuration sets the exposure correction amount from the gain amount first, but the present invention is not limited thusly. For example, the configuration may set the exposure correction amount from the accumulation time first. The configuration may also perform the exposure correction control processing by changing only one of either the gain amount or the accumulation time. According to the present embodiment, the configuration is not limited to calculating the number of images for diaphragm drive, and the diaphragm drive number may be set as desired by the user so long as the exposure change amount is not excessive.

According to the present embodiment, the configuration sets the exposure difference $\Delta G1$ so that the difference in exposure between the compositing images is between 1 Ev to 2 Ev, but the present invention is not limited thusly. For example, the configuration may use a range between 1 Ev to 3 Ev as the reference for other differences in exposure.

Third Embodiment

According to the previously described First and Second Embodiments, the compositing images used for HDR composite processing included two types of images, the underexposed image and the correct exposure image. If the difference between the maximum luminance and the minimum luminance of the subject is significant, for example, performing the HDR composite processing with only these two types of compositing images, there are cases in which the images having the desired level of brightness by the user may not be obtained.

Thus, regarding the moving image HDR mode according to the present embodiment, a camera capable of a dynamic range even wider than that of the previously described First and Second Embodiments by using three types of compositing images are used for the HDR composite processing will be described.

Specifically, a configuration and operation will be described with reference to FIGS. 10 through 11B regarding an imaging apparatus in which an overexposed image (third image), which has a relatively larger amount of exposure than the correct exposure image, is used in addition to the underexposed image and the correct exposure image used in the previously described embodiments.

Figure 2:
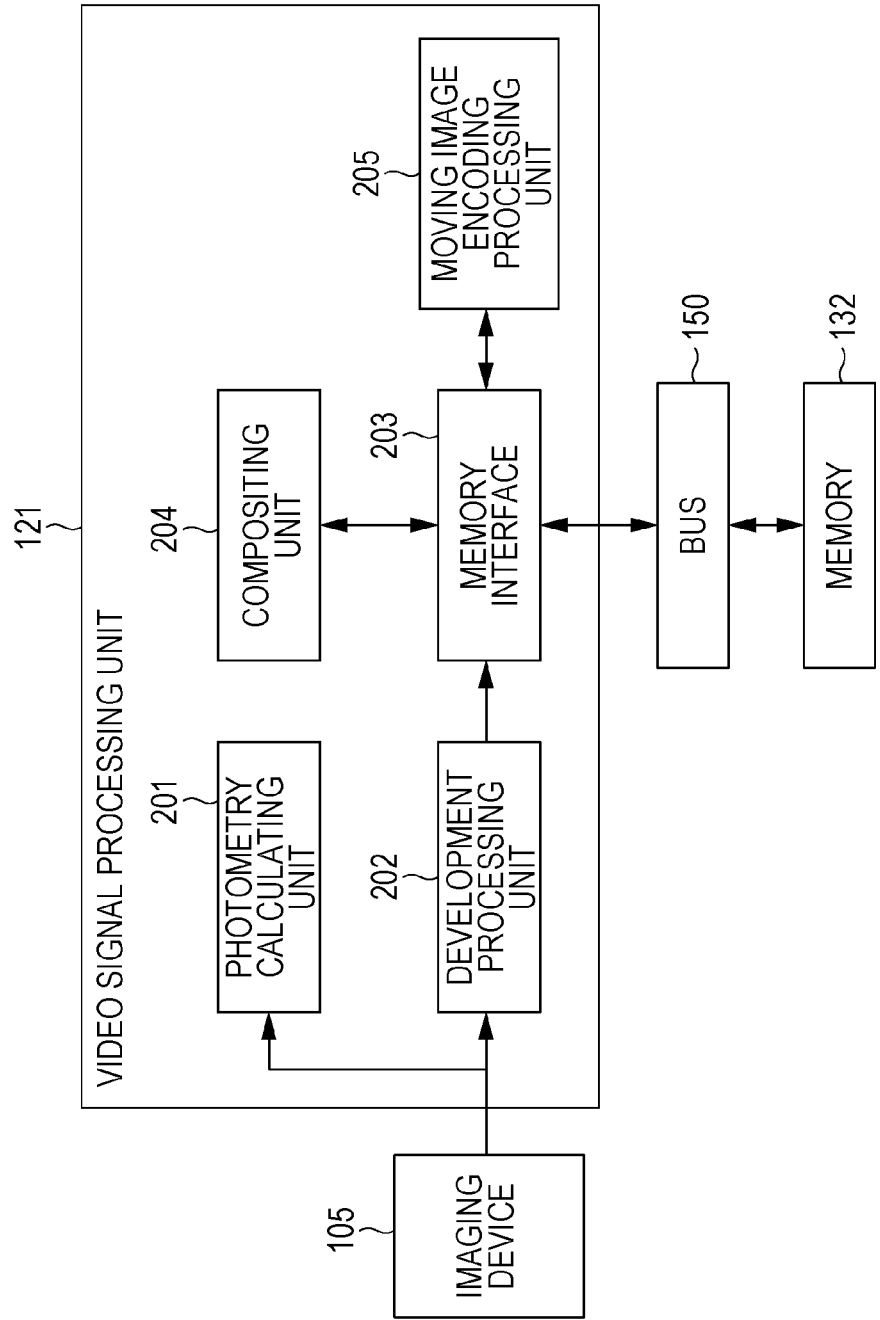
FIG. 2 is a diagram illustrating an example configuration of a video signal processing unit according to the First Embodiment of the present invention.

The basic configuration of the imaging apparatus according to the present embodiment is similar to the First Embodiment illustrated in FIGS. 1 and 2, and so its description is omitted.

Figure 10:
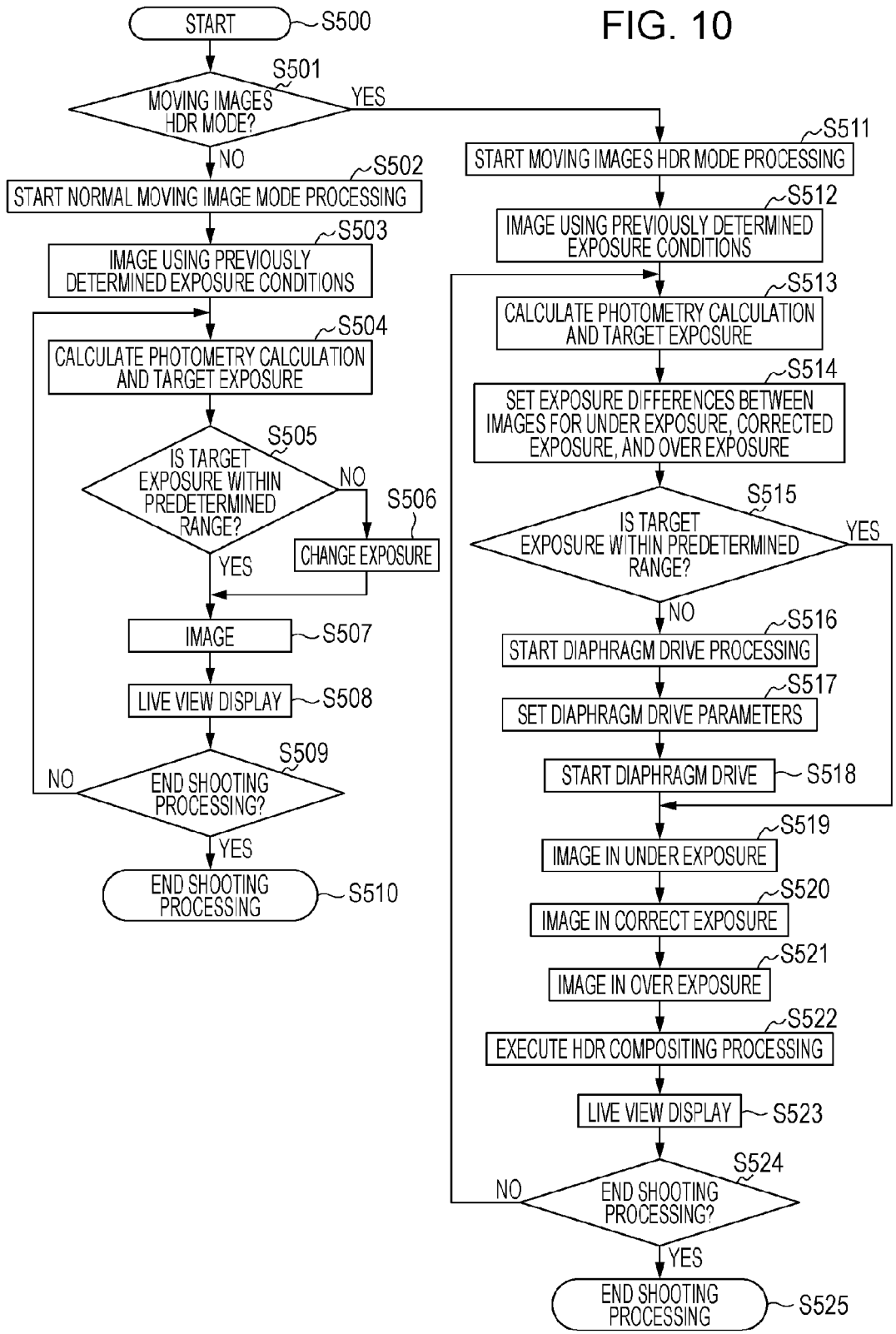
FIG. 10 is a flowchart describing an example of an operation process of the imaging apparatus according to a Third Embodiment of the present invention.

FIG. 10 is a flowchart illustrating an operation of the imaging apparatus according to the present embodiment. Each step of the operation regarding the flow illustrated in FIG. 10 is implemented by the CPU 131 provisioned within the camera 100 executing a program stored within the memory 132.

Figure 11A:
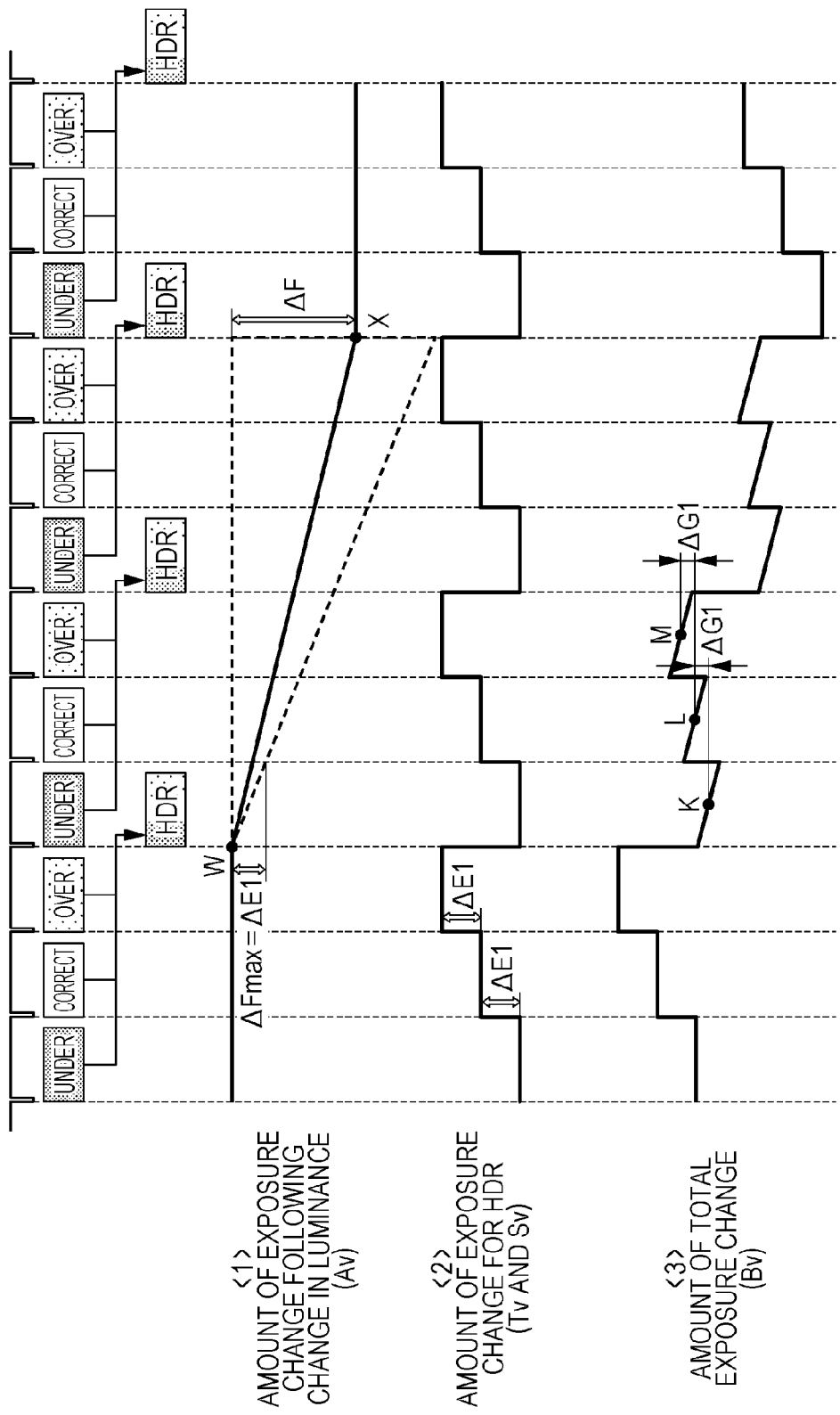
FIGS. 11A and 11B are timing charts illustrating example timings of exposure control in the imaging apparatus according to the Third Embodiment of the present invention.
Figure 11B:
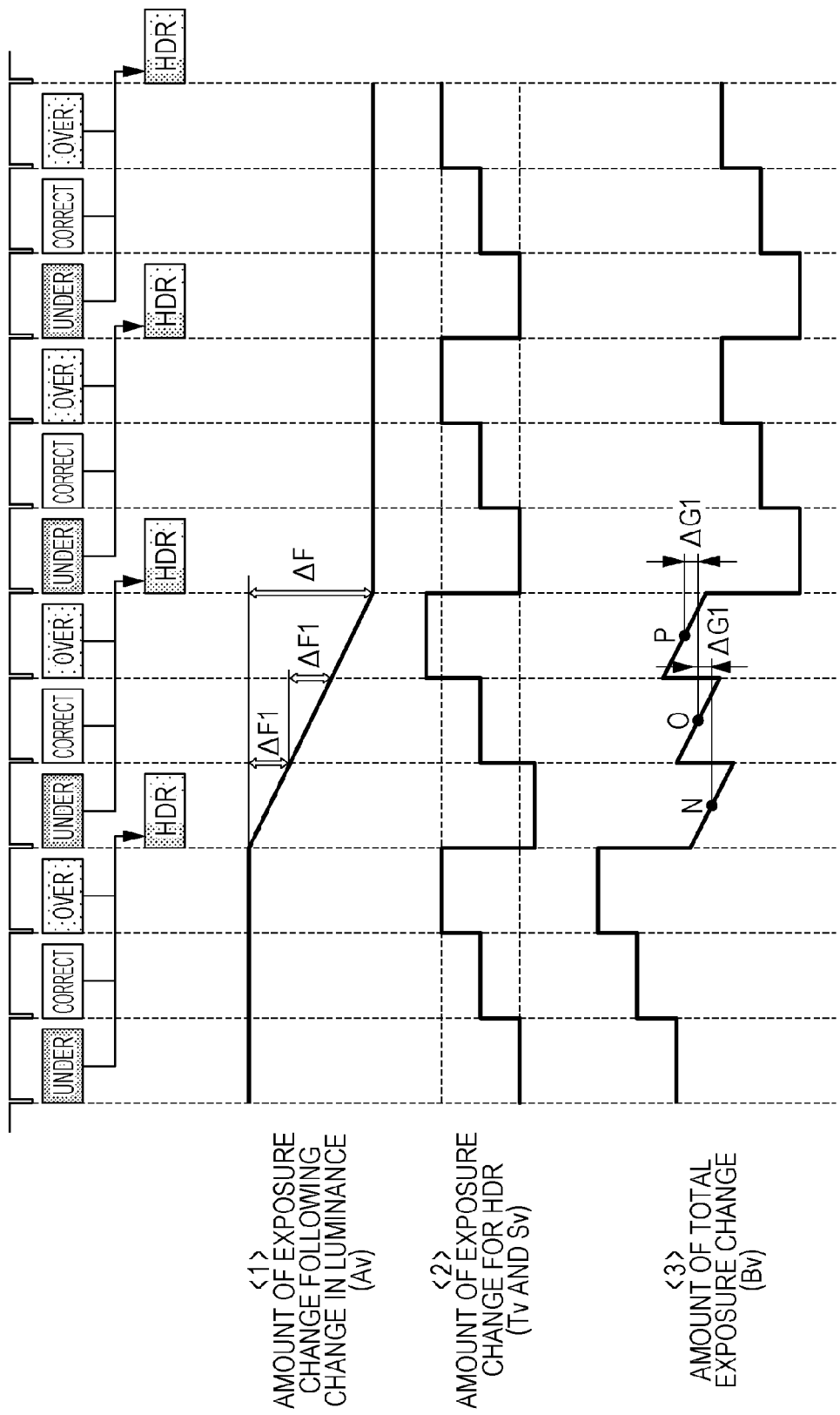

FIGS. 11A and 11B are timing charts illustrating continuous changes in exposure amount and exposure control timings during diaphragm drive. FIG. 11A is a timing chart illustrating the case when controlling the drive of the diaphragm using a lens capable of driving a micro step diaphragm similar to that of the First Embodiment. FIG. 11B is a timing chart illustrating the case when controlling the accumulation time and gain amount during diaphragm drive similar to that of the Second Embodiment. Hereafter, the operation of the camera 100 according to the present embodiment will be described with reference to the flow in FIG. 10. The flow in FIG. 10 describes the operation related to the imaging apparatus having the configuration illustrated in FIG. 11A.

Regarding FIG. 10, before shooting processing begins, preparation related to shooting is first completed by operating the units configuring the previously described camera 100. At step S500, the CPU 131 detects that the live view start/stop button 164 has been pressed and starts the shooting processing.

Next, at step S501, the CPU 131 determines whether or not the moving image mode selected by the user is the moving image HDR mode. When the mode is determined not to be the moving image HDR mode, the normal moving image mode is selected. The normal moving image mode is similar to that of the previously described First Embodiment, and so its description is omitted.

When it is determined that the moving image HDR mode has been set at step S501, processing proceeds to step S511, and the processing related to the HDR moving image mode is started. The operations at steps S512 and S513 are similar to that in the previously described First Embodiment, and so its description is omitted.

At step S514, the CPU 131 sets the fixed difference in exposure between the exposure amounts of underexposed image, the correct exposure image, and the overexposed image used in the HDR composite processing on the basis of the result of the photometry calculation from step S513. According to the present embodiment, the fixed difference in exposure between each compositing image uses the correct exposure as the reference, decreasing the exposure amount by two levels (−2 Ev) for the underexposure, and increasing the exposure amount by two levels (+2 Ev) for the overexposure. The configuration may also allow fixed differences in exposure other than those described to be set as desired by the user.

Next, at step S515, the CPU 131 determines whether or not the target exposure calculated at step S513 is within the predetermined range (blind zone). When the target exposure is within the predetermined range, processing proceeds to step S519. When the target exposure is outside the predetermined range, processing proceeds to step S516. The predetermined range (blind zone) according to the present embodiment is similar to that of the previously described First Embodiment.

Next, when the target exposure is determined at step S515 to be outside the predetermined range, processing proceeds to step S516, and the CPU 131 starts the diaphragm drive control.

Next, at step S517, the CPU 131 sets the diaphragm drive parameters. The method to decide the diaphragm drive parameters according to the present embodiment is similar to that for the previously described First Embodiment except for the details regarding the overexposed image. The operation for the subsequent steps from step S518 are similar to the operations from step S118 for the previously described First Embodiment.

As previously described and as illustrated in FIG. 11A regarding the present embodiment, exposure control is performed so that the exposure amount between the three compositing images when driving the diaphragm maintains the relative relationship of the exposure amount between the three compositing images when not driving the diaphragm.

That is to say, the exposure control is performed by driving the diaphragm so that the exposure amount for point L in FIG. 11A is larger than for point K, and the exposure amount for point M is larger than for point L.

Point K represents the average exposure amount for underexposure during diaphragm drive according to the present embodiment. Hereinafter, point L similarly represents the average exposure amount for correct exposure, and point M represents the average exposure amount for overexposure.

As illustrated in FIG. 11A and according to the present embodiment and similar to the previously described First Embodiment, diaphragm drive is performed so that the unit diaphragm change exposure amount $\Delta F1$ does not exceed the maximum unit aperture $\Delta Fmax$.

That is to say, HDR composite processing can be performed correctly while following changes in the luminance of the subject by controlling the drive of the diaphragm so that the amount of exposure change during diaphragm drive does not exceed the difference in exposure between compositing images when not driving the diaphragm.

The sequence to obtain the compositing images used for HDR composite processing according to the present embodiment is from the underexposed image to the correct exposure image, and then the overexposed image. This is because the timing to read the electrical charge from the imaging device 105 is periodic as previously described, and the timing to start the accumulation is set to be reversely calculated from the readout timing. According to the present embodiment and similar to the previously described First Embodiment, the HDR composite processing effect can be maintained by at least a constant level during diaphragm drive by establishing the exposure difference between compositing images $\Delta G1$.

According the previously described configuration, the underexposure is set for the underexposed image obtained first at step S518 after the setting of the diaphragm drive parameters is complete. Processing then proceeds to step S519, and the CPU 131 starts driving the diaphragm 102 while simultaneously obtaining the underexposed image.

Afterwards, at step S520, the CPU 131 obtains the correct exposure image while continuing to drive the diaphragm 102 in accordance with the previously obtained diaphragm drive parameters.

Similarly, at step S521, the CPU 131 obtains the overexposed image while continuing to drive the diaphragm 102 in accordance with the previously obtained diaphragm drive parameters. The subsequent steps from steps S522 to S525 are similar to steps S121 to S124 for the previously described First Embodiment, and so their descriptions are omitted. This completes the description of the operation when controlling the drive of the diaphragm when using the underexposed image, the correct exposure image, and the overexposed image as the three compositing images.

Regarding other cases of control besides the diaphragm drive, next a case in which the gain amount and accumulation time are controlled similarly to the previously described Second Embodiment will be described with reference to the timing chart in FIG. 11B. Point N in FIG. 11B represents the average exposure amount for underexposure at the corresponding position in the diagram. Similarly, points O and P represent the average exposure amount for the correct exposure and the overexposure, respectively, at the corresponding positions in the diagram.

As illustrated in FIG. 11B, the gain amount and the accumulation time is changed so that the exposure amount for point O is adjusted to be larger than for point N, and the exposure amount for point P is adjusted to be larger than for point O. That is to say, exposure control is performed from the accumulation time and the gain amount so that the exposure amount for the compositing images used as one composite set during diaphragm drive maintains the relative relationship of the exposure amount between the compositing images when not driving the diaphragm. The configuration and operation of the imaging apparatus performing the operation illustrated in FIG. 11B are similar to that of the previously described Second Embodiment, and so their descriptions are omitted.

The difference between the present embodiment and the Second Embodiment is the addition of the overexposed image to the compositing images in addition to the underexposed image and the correct exposure image. Therefore, according to the present embodiment, similar to the unit diaphragm change exposure amount $\Delta F1$ between the underexposed image and the correct exposure image, the unit diaphragm change exposure amount between the correct exposure image and the overexposed image is also designated as $\Delta F1$.

According to the Second Embodiment, the exposure correction amount from the gain amount and accumulation time has been obtained so that the exposure difference between compositing images $\Delta G1$ during diaphragm drive is at least 1 Ev and less than 2 Ev. In addition, two compositing images have been obtained in accordance with the exposure correction amount. However, according to the present embodiment, there are three compositing images. As illustrated in FIG. 11B, only the exposure amount for the underexposure and overexposure is corrected on the basis of the exposure correction amount during diaphragm drive previously determined. That is to say, the exposure amount for the correct exposure image is not corrected.

According to this configuration, the exposure amount for the compositing images enables HDR composite processing to be performed correctly by conducting exposure correction control processing only when obtaining the underexposed image and the overexposed image. Other details of the configuration are similar to that of the previously described Second Embodiment.

As previously described, according to the imaging apparatus regarding the configuration of the present embodiment, HDR composite processing can be correctly performed while performing exposure control following the luminance of the subject for the case when using three compositing images.

Images with a dynamic range even wider than that of the previously described First Embodiment and Second Embodiment can be obtained by using the underexposed image, correct exposure image, and overexposed image as the compositing images.

According to the present embodiment, a case has been described using three compositing images, but the embodiment is not limited thusly. For example, the configuration may further increase the number of compositing images. In addition, the configuration may consecutively change the number of compositing images depending on the photometry result.

The configuration in this case may be implemented by settings made as desired by the user, or by the CPU 131 executing a predetermined program stored in the memory 132 on the basis of the photometry result.

The present embodiment has been described in which the fixed difference in exposure between the underexposure and the correct exposure is the same as the fixed difference in exposure between the correct exposure and the overexposure (illustratively set to ±2 Ev according to the present embodiment), but the present invention is not limited thusly.

For example, the configuration may set the fixed difference in exposure between the underexposure and the correct exposure to be different from the fixed difference in exposure between the correct exposure and the overexposure. The configuration preferably sets the unit diaphragm change exposure amount $\Delta F1$ in this case to match the smaller exposure difference.

Other Embodiments

The previously described First, Second, and Third Embodiments described cases in which the diaphragm drive has been driven from the so-called opening side to the closed side.

According to the present embodiment, an imaging apparatus is described with reference to FIGS. 12A and 12B for a case when driving the diaphragm from the closed side to the opening side without changing the sequence to obtain the compositing images regarding the previously described First, Second, and Third Embodiments.

The basic configuration and operation of the imaging apparatus according to the present embodiment are similar to the First Embodiment, and so their descriptions are omitted. The present embodiment will illustratively describe the case in which two images, the underexposed image and the correct exposure image, are used as compositing images for the HDR composite processing.

Figure 12A:
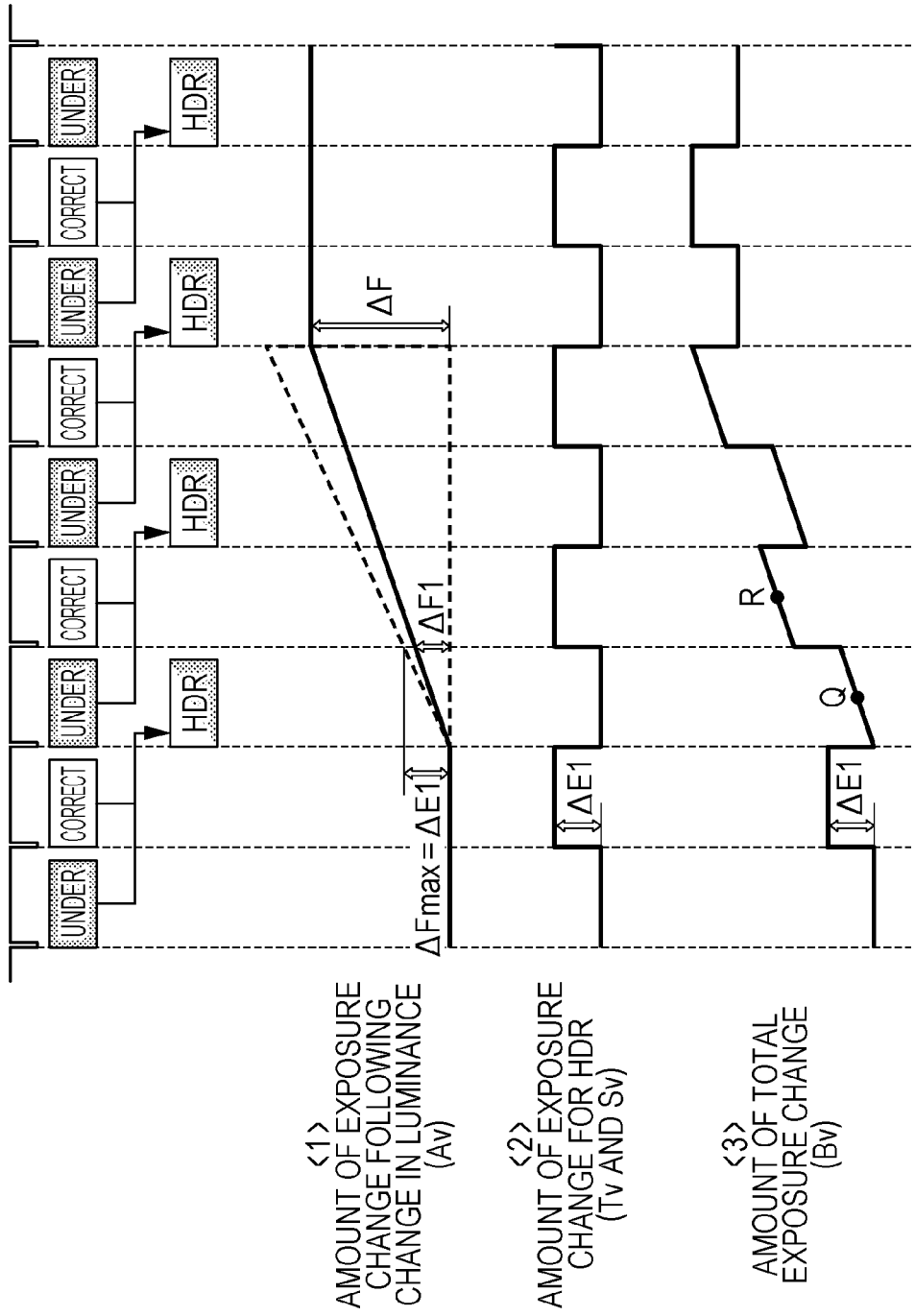

FIG. 12A is a timing chart illustrating continuous changes in exposure amounts and exposure control timings when not controlling the drive of the diaphragm using the method similar to that of the previously described First Embodiment. Points Q and R represent the average exposure amounts for the corresponding compositing images.

FIG. 12B is a timing chart illustrating continuous changes in exposure amounts and exposure control timings when driving the diaphragm 102 from the closed side to the opening side with a drive amount larger than that of the imaging apparatus regarding the previously described First Embodiment. Points S and T represent the average exposure amounts for the corresponding compositing images.

As illustrated in FIG. 12B, when the diaphragm is driven from the closed side to the opening side, the relationship of the exposure amount between the compositing images during diaphragm drive maintains the relative relationship of the exposure amount between the compositing images when not driving the diaphragm even though the diaphragm drive amount is increased. That is to say, the relative relationship of the exposure amount between the underexposed image and the correct exposure image imaged when operating the lens drive unit 141 to drive the diaphragm 102 is the same as when not operating the lens drive unit 141 to drive the diaphragm 102. However, the difference in the exposure amount between the underexposed image and the correct exposure image during diaphragm drive increases due to the increase in diaphragm drive amount.

Figure 13A:
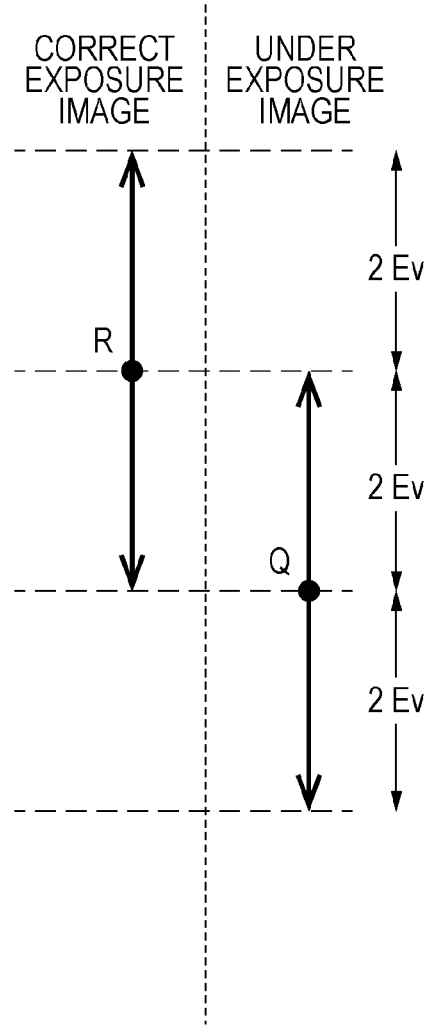
FIGS. 13A and 13B are diagrams illustrating an example tonal range that can be expressed by the imaging apparatus according to another Embodiment.

Generally when performing HDR composite processing, if the difference between compositing images increases, the resulting composite image appears unnatural to and not what was intended by the user. Hereafter, this case will be described with reference to FIGS. 13A and 13B. FIG. 13A illustrates the dynamic range of an image after compositing obtained by the HDR composite processing regarding an imaging apparatus in which the difference in exposure between the underexposed image and the correct exposure image is set to 2Ev. Points Q and R correspond to points Q and R illustrated in FIG. 12A. When the diaphragm is not driven, that is to say, when there is no change in luminance of the subject, the difference in the exposure amount between the compositing images is maintained at 2 Ev as only the exposure control (exposure control for HDR) between compositing images is performed. That is to say, the difference in the exposure amount between points Q and R is 2 Ev.

Figure 13B:
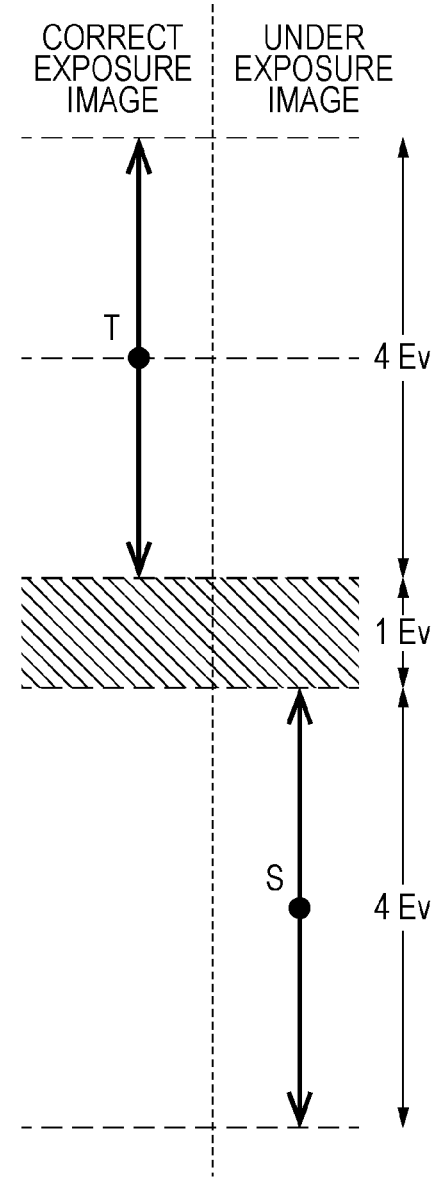

FIG. 13B illustrates the dynamic range of an image after compositing obtained by the HDR composite processing when driving the diaphragm regarding an imaging apparatus using the same conditions as that in FIG. 13A. Points S and T correspond to points S and T illustrated in FIG. 12B. FIG. 13B illustrates the case when the difference in the exposure amount between the underexposure and the correct exposure changes to 5 Ev due to the drive of the diaphragm. That is to say, the exposure amount between points S and T is 5 Ev.

As illustrated in FIG. 13B, it is understood that the difference in the exposure amount between the compositing images changed due to the drive of the diaphragm. Therefore, when driving the diaphragm, there is a potential that images may not be obtained at the correct exposure as indicated by the section of slanted lines in FIG. 13B.

Thus, excessive changes in the difference of the exposure amount between the compositing images is prevented by giving the imaging apparatus according the present embodiment the same configuration as that of the previously described First Embodiment and performing the same operations.

In addition, according to the present embodiment, the exposure difference between compositing images $\Delta G1$ during diaphragm drive described for the previous embodiment is not established. This is because the difference in the exposure amount during diaphragm drive to drive the diaphragm from the closed side to the opening side is sufficient for obtaining the HDR composite processing effect.

As illustrated in FIG. 12A and according to the present embodiment, the diaphragm drive is controlled in the same way as in the previously described First Embodiment. That is to say, the maximum unit aperture $\Delta Fmax$ is set to the exposure difference $\Delta E1$ between the compositing images when not driving the diaphragm. The operations of the imaging apparatus according to the present embodiment are similar to the First Embodiment excluding those points just described, and so their descriptions are omitted. Therefore, the actual amount of exposure that changes per image is not larger than $\Delta E1$, and so the difference in the exposure amount between the compositing images does not increase excessively even when driving the diaphragm.

Thus, the imaging apparatus according to the present embodiment can control the difference in the exposure amount between the compositing images to not excessively increase during diaphragm drive to drive the diaphragm from the closed side to the opening side. That is to say, the imaging apparatus according to the present embodiment can correctly obtain multiple images having different exposure amounts which are used for compositing while performing exposure control following changes in the luminance of the subject.

According to the present embodiment, the exposure difference between compositing images $\Delta G1$ during diaphragm driving is not established, but the configuration may be made where the $\Delta G1$ is established. In this case, the $\Delta G1$ is preferably set to be less than the difference $\Delta E1$ between compositing images when not driving the diaphragm (2 Ev) to prevent the difference in the exposure amount from increasing excessively during diaphragm drive.

Thus the preferable embodiments of the present invention have been described, but the present invention is not limited to these embodiments, and it should be understood that various modifications could be made as long as these modifications are within the scope and spirit of the present invention.

The exposure control performed following changes in luminance of the subject according to the previously described embodiments is implemented by driving the diaphragm, but the present invention is not limited thusly.

For example, the configuration may further include the provision of an ND filter in the imaging apparatus regarding the previously described embodiments, and the CPU (ND filter control unit) 131 may progressively change the amount of light transmitted through the ND filter depending on changes in luminance of the subject. The configuration may also simultaneously drive multiple members such as diaphragm drive and ND filters (light amount adjustment members) for adjusting the amount of light, and control the drive of these light amount adjustment members.

The operations of the camera 100 regarding the present invention are controlled by the video signal processing unit 121, the CPU 131, the lens drive unit 141, the shutter drive unit 142, the timing generating unit 143, and the display control unit 151, but the present invention is not limited thusly. For example, the configuration may store a program following the flows illustrated in the previously described FIGS. 4, 6, 8, 9, and 10 in the memory 132, in which the CPU 131 executes the program to control the drive of each unit in the camera 100.

In addition, the previously described embodiments have been described using the digital camera 100 as an example of the imaging apparatus implementing the present invention, but the present invention is not limited thusly. For example, the present invention may be applied to various imaging apparatuses within the scope of the present invention, such as portable devices including digital video cameras and smartphones.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-101287 filed May 13, 2013, which is hereby incorporated by reference herein in its entirety.

What is claimed is:

1. An imaging apparatus which can set a high-dynamic-range mode which outputs a first image and outputs a second image with an exposure amount different from that of the first image after the first image, the imaging apparatus comprising at least one processor coupled to at least one memory, the at least one processor being programmed to implement:
   a light amount adjustment unit configured to drive a light amount adjustment member to adjust the amount of light input to an imaging unit which outputs images by imaging a subject;
   a control unit configured to control the imaging unit; and
   a setting unit configured to set a difference in the exposure amount between the first image and the second image to a predetermined difference based on at least one of the light amount adjustment by the light amount adjustment unit and the controlling of the imaging unit by the control unit when the high-dynamic-range mode is set,
   wherein the first image and the second image are images used for compositing,
   wherein the predetermined difference is a difference that maintains relative relationship in the exposure amount between the first image and the second image, and
   wherein the setting unit sets the predetermined difference in the exposure amount so that the relative relationship in the exposure amount between the first image and the second image outputted when the light amount adjustment member is driven in accordance with changes in a luminance of the subject is the same as the relative relationship in the exposure amount between the first image and the second image outputted when the light amount adjustment member is not driven.

2. The imaging apparatus according to claim 1, wherein the setting unit sets the predetermined difference so that the difference in the exposure amount between the first image and second image outputted when the light amount adjustment member is driven in accordance with changes in the luminance of the subject is within a range of absolute values of the difference in the exposure amount between the first image and the second image outputted when the light amount adjustment member is not driven.

3. The imaging apparatus according to claim 1, wherein the setting unit sets the predetermined difference based on the driving of the light amount adjustment member by the light amount adjustment unit.

4. The imaging apparatus according to claim 3, wherein the setting unit sets the predetermined difference so that the number of images output from the imaging unit controlled by the control unit while the light amount adjustment member is driven is a multiple of the number of images used for compositing.

5. The imaging apparatus according to claim 3, wherein the light amount adjustment unit controls driving of the light amount adjustment member in accordance with changes in the luminance of the subject so that the driving of the light amount adjustment member ends in alignment with the timing at which the imaging of the second image ends.

6. The imaging apparatus according to claim 5, wherein the light amount adjustment unit controls the driving of the light amount adjustment member in accordance with changes in the luminance of the subject so that the driving of the light amount adjustment member starts in alignment with the timing at which the imaging of the first image starts.

7. The imaging apparatus according to claim 3, wherein the setting unit sets the predetermined difference based on a predetermined amount of the driving the light amount adjustment member per unit time in accordance with changes in the luminance of the subject, and
   wherein the predetermined amount is an amount equivalent to half an absolute value of a difference in exposure between the first image and the second image when the light amount adjustment member is not driven.

8. The imaging apparatus according to claim 1, wherein the light amount adjustment member is either a diaphragm or an ND (neutral density) filter.

9. The imaging apparatus according to claim 1, wherein the second image has an exposure amount larger than the exposure amount of the first image.

10. The imaging apparatus according to claim 9, further comprising:
    a compositing unit configured to composite the first image and the second image to generate a composite image,
    wherein the composite image has a dynamic range wider than that of the first image or the second image.

11. The imaging apparatus according to claim 1, wherein the control unit controls at least one of either the accumulation time or gain amount while the imaging unit images the subject,
    and wherein the setting unit sets the predetermined difference based on the control by the control unit of at least one of either the accumulation time or the gain amount, when the light amount adjustment member is driven in accordance with changes in the luminance of the subject.

12. The imaging apparatus according to claim 11, wherein the setting unit sets the predetermined difference so that a difference in exposure between the first image and the second image when the light amount adjustment member is driven is equal to or larger than half an absolute value of a difference in exposure between the first image and the second image when the light amount adjustment member is not driven, based on the control by the control unit of at least one of either the accumulation time or the gain amount when the light amount adjustment member is driven in accordance with changes in the luminance of the subject.

13. The imaging apparatus according to claim 1, wherein the control unit controls at least one of either the accumulation time or the gain amount while the imaging unit images the subject for setting a fixed difference in exposure between the first image and the second image regardless of changes in the luminance of the subject,
    wherein the light amount adjustment member is a diaphragm, and
    wherein the light adjustment unit drives the light amount adjustment member while the first image and the second image are outputted in accordance with changes in the luminance of the subject regardless of the fixed difference.

14. An imaging apparatus comprising at least one processor coupled to at least one memory, the at least one processor being programmed to implement:
- a light amount adjustment unit configured to drive a light amount adjustment member to adjust the amount of light input to an imaging unit;
- a control unit configured to control the imaging unit in a first mode or a second mode; and
- a setting unit configured to set a first level of light amount adjustment corresponding to a driving amount per unit time of the light amount adjustment member in the first mode, and to set a second level of light amount adjustment corresponding to the driving amount per unit time of the light amount adjustment member in the second mode;
- wherein the imaging unit continuously outputs images not used for compositing in the first mode,
- wherein the imaging unit continuously outputs images used for compositing in the second mode,
- wherein the setting unit sets the first level and the second level so that a level of light amount adjustment per unit time of the light amount adjustment member when the light amount adjustment member is driven in the second mode in accordance with changes in a luminance of a subject is less than a level of light amount adjustment per unit time of the light amount adjustment member when the light amount adjustment member is driven in the first mode in accordance with changes in the luminance of the subject, and
- wherein the light amount adjustment member is at least one of a diaphragm and an ND (neutral density) filter.

15. The imaging apparatus according to claim 14, wherein the second level is a level of light amount adjustment corresponding to the driving amount of the light amount adjustment member such that the change in the exposure amount per image is reduced by more than that by the first level.

16. A control method of an imaging apparatus which can set a high-dynamic-range mode which outputs a first image and outputs a second image with an exposure amount different from that of the first image after the first image, the imaging apparatus comprising at least one processor coupled to at least one memory, the at least one processor being programmed to implement a light amount adjustment unit for driving a light amount adjustment member to adjust the amount of light input to an imaging unit which outputs images by imaging a subject, the control method comprising:
- a control step to control the imaging unit; and
- a setting step to set a difference in the exposure amount between the first image and the second image to a predetermined difference based on at least one of the light amount adjustment by the light amount adjustment unit and the controlling of the imaging unit by the control step when the high-dynamic-range mode is set,
- wherein the first image and the second image are images used for compositing,
- wherein the predetermined difference is a difference that maintains relative relationship in the exposure amount between the first image and the second image, and
- wherein the setting step sets the predetermined difference in the exposure amount so that the relative relationship in the exposure amount between the first image and the second image outputted when the light amount adjustment member is driven in accordance with changes in a luminance of the subject is the same as the relative relationship in the exposure amount between the first image and the second image outputted when the light amount adjustment member is not driven.

17. A control method of an imaging apparatus comprising at least one processor coupled to at least one memory, the at least one processor being programmed to implement a light amount adjustment unit for driving a light amount adjustment member to adjust the amount of light input to an imaging unit, the control method comprising:
- a control step to control the imaging unit in a first mode or a second mode; and
- a setting step to set a first level of light amount adjustment corresponding to a driving amount per time of the light amount adjustment member in the first mode, and to set a second level of light amount adjustment corresponding to the driving amount per time of the light amount adjustment member in the second mode;
- wherein the imaging unit continuously outputs images not used for compositing in the first mode,
- wherein the imaging unit continuously outputs images used for compositing in the second mode,
- wherein the setting step sets the first level and the second level so that a level of light amount adjustment per unit time of the light amount adjustment member when the light amount adjustment member is driven in the second mode in accordance with changes in a luminance of a subject is less than a level of light amount adjustment per unit time of the light amount adjustment member when the light amount adjustment member is driven in the first mode in accordance with changes in the luminance of the subject, and
- wherein the light amount adjustment member is at least one of a diaphragm and an ND (neutral density) filter.

18. A non-transitory computer-readable storage medium storing a program for causing a computer to execute the control method of an imaging apparatus which can set a high-dynamic-range mode which outputs a first image and outputs a second image with an exposure amount different from that of the first image after the first image, the imaging apparatus comprising at least one processor coupled to at least one memory, the at least one processor being programmed to implement a light amount adjustment unit for driving a light amount adjustment member to adjust the amount of light input to an imaging unit which outputs images by imaging a subject, the control method comprising:
- a control step to control the imaging unit; and
- a setting step to set a difference in the exposure amount between the first image and the second image to a predetermined difference based on at least one of the light amount adjustment by the light amount adjustment unit and the controlling of the imaging unit by the control step when the high-dynamic-range mode is set,
- wherein the first image and the second image are images used for compositing,
- wherein the predetermined difference is a difference that maintains relative relationship in the exposure amount between the first image and the second image, and
- wherein the setting step sets the predetermined difference in the exposure amount so that the relative relationship in the exposure amount between the first image and the second image outputted when the light amount adjustment member is driven in accordance with changes in a luminance of a subject is the same as the relative relationship in the exposure amount between the first image and the second image outputted when the light amount adjustment member is not driven.

19. A non-transitory computer-readable storage medium storing a program for causing a computer to execute the control method of an imaging apparatus comprising at least one processor coupled to at least one memory, the at least one processor being programmed to implement a light amount adjustment unit for driving a light amount adjustment member to adjust the amount of light input to an imaging unit, the control method comprising:
- a control step to control the imaging unit in a first mode or a second mode; and
- a setting step to set a first level of light amount adjustment corresponding to a driving amount per time of the light amount adjustment member in the first mode, and to set a second level of light amount adjustment corresponding to the driving amount per time of the light amount adjustment member in the second mode;

wherein the imaging unit continuously outputs images not used for compositing in the first mode, wherein the imaging unit continuously outputs images used for compositing in the second mode, wherein the setting step sets the first level and the second level so that a level of light amount adjustment per unit time of the light amount adjustment member when the light amount adjustment member is driven in the second mode in accordance with changes in a luminance of a subject is less than a level of light amount adjustment per unit time of the light amount adjustment member when the light amount adjustment member is driven in the first mode in accordance with changes in the luminance of the subject, and wherein the light amount adjustment member is at least one of a diaphragm and an ND (neutral density) filter.

* * * * *